(12) United States Patent
Shinozaki et al.

(10) Patent No.: US 10,337,242 B2
(45) Date of Patent: Jul. 2, 2019

(54) DAYLIGHTING DEVICE AND DAYLIGHTING SYSTEM

(71) Applicant: SHARP KABUSHIKI KAISHA, Sakai, Osaka (JP)

(72) Inventors: Daisuke Shinozaki, Sakai (JP); Shun Ueki, Sakai (JP); Shumpei Nishinaka, Sakai (JP); Toru Kanno, Sakai (JP); Tsuyoshi Kamada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/569,749

(22) PCT Filed: Apr. 22, 2016

(86) PCT No.: PCT/JP2016/062784
§ 371 (c)(1),
(2) Date: Oct. 26, 2017

(87) PCT Pub. No.: WO2016/175149
PCT Pub. Date: Nov. 3, 2016

(65) Prior Publication Data
US 2018/0142517 A1    May 24, 2018

(30) Foreign Application Priority Data
Apr. 30, 2015 (JP) ................. 2015-093620

(51) Int. Cl.
| | | |
|---|---|---|
| E06B 9/42 | (2006.01) | |
| F21S 11/00 | (2006.01) | |
| E06B 9/24 | (2006.01) | |
| G02B 5/00 | (2006.01) | |
| B32B 7/02 | (2019.01) | |
| E06B 5/00 | (2006.01) | |
| G02B 5/02 | (2006.01) | |

(52) U.S. Cl.
CPC ............... *E06B 9/42* (2013.01); *B32B 7/02* (2013.01); *E06B 5/00* (2013.01); *E06B 9/24* (2013.01); *F21S 11/002* (2013.01); *F21S 11/007* (2013.01); *G02B 5/00* (2013.01); *G02B 5/0205* (2013.01); *E06B 2009/2417* (2013.01)

(58) Field of Classification Search
CPC .................................................. F21S 11/007
See application file for complete search history.

(56) References Cited

U.S. PATENT DOCUMENTS

| | | | |
|---|---|---|---|
| 9,885,453 B2 * | 2/2018 | Tsujimoto | ............... F21V 3/06 |
| 2013/0265642 A1 * | 10/2013 | Vasylyev | ........... G02B 19/0042 |
| | | | 359/595 |

(Continued)

FOREIGN PATENT DOCUMENTS

| | | |
|---|---|---|
| CN | 103534432 A | 1/2014 |
| JP | H06-033671 A | 2/1994 |

(Continued)

*Primary Examiner* — Christopher E Mahoney
(74) *Attorney, Agent, or Firm* — ScienBiziP, P.C.

(57) ABSTRACT

A daylighting device (10) including: a flexible base material (20) having light-transmitting properties; and a plurality of daylighting sections (30) on at least one of faces (20a) of the base material (20), each of the daylighting sections having light-transmitting properties and including at least two protrusion portions adjacent to each other.

18 Claims, 36 Drawing Sheets

(56) References Cited

U.S. PATENT DOCUMENTS

| | | | |
|---|---|---|---|
| 2014/0104689 A1 | 4/2014 | Padiyath et al. | |
| 2014/0138037 A1* | 5/2014 | Colson | E06B 9/42 160/290.1 |
| 2015/0354272 A1* | 12/2015 | Vasylyev | E06B 9/42 160/133 |
| 2016/0223155 A1* | 8/2016 | Nango | E06B 9/24 |
| 2016/0252225 A1 | 9/2016 | Tsujimoto et al. | |
| 2017/0248742 A1* | 8/2017 | Nirmal | G02B 5/0231 |

FOREIGN PATENT DOCUMENTS

| | | |
|---|---|---|
| JP | H09-282916 A | 10/1997 |
| JP | 2012-224975 A | 11/2012 |
| JP | 2013-124457 A | 6/2013 |
| JP | 2013-155569 A | 8/2013 |
| JP | 2014-515123 A | 6/2014 |
| WO | 2012125423 A1 | 9/2012 |
| WO | 2015/056736 A1 | 4/2015 |

\* cited by examiner

DAYLIGHTING DEVICE AND DAYLIGHTING SYSTEM

TECHNICAL FIELD

The present invention relates to daylighting devices and daylighting systems.

The present application claims priority to Japanese Patent Application, Tokugan, No. 2015-093620 filed in Japan on Apr. 30, 2015, the entire contents of which are incorporated herein by reference.

BACKGROUND ART

One of conventional technologies to efficiently direct indoors the light that is incident on a window pane is a light-distribution control curtain that includes a daylighting layer disposed on at least on one surface of a curtain made of translucent material, the daylighting layer having a lenticular, linear prismatic, pyramid prismatic, or other like light-refracting fine structure (see, for example, Patent Literature 1).

CITATION LIST PATENT LITERATURE

Patent Literature 1: Japanese Unexamined Patent Application Publication, Tokukaihei, No. 6-33671

SUMMARY OF INVENTION

Technical Problem

Because the light-distribution control curtain described in Patent Literature 1 is a roll screen, the curtain needs to be flexible so that it can be wound without leaving empty space. To achieve such flexibility, the daylighting layer needs to be thin.

On the other hand, if the daylighting layer is thinned down, the daylighting layer could lose its mechanical strength, present more difficulty in manufacturing, and have low yields, to name a few problems. In addition, the fine structure elements need to be decreased in size. Taking into consideration, for example, the needs for fabrication of a metal die for the fine structure and alignment in transferring the shape of the fine structure, the fine structure becomes more difficult to manufacture as the fine structure decreases in size. Additionally, as the fine structure becomes smaller in size, the flat portion, or the base, of the fine structure becomes thinner, which in turn undesirably lowers the strength of the daylighting layer.

Some aspects of the present invention, conceived in view of these problems, have an object to provide a daylighting device that can be wound without leaving empty space and a daylighting system incorporating such a daylighting device.

Solution to Problem

A daylighting device in accordance with one aspect of the present invention includes: a flexible base material having light-transmitting properties; and a plurality of daylighting sections disposed on one of faces of the base material, each of the daylighting sections having light-transmitting properties and including at least two protrusion portions adjacent to each other, wherein the daylighting sections are separated by a distance from each other on that one of the faces of the base material.

In a daylighting device in accordance with another aspect of the present invention, the daylighting sections are preferably disposed without leaving empty space therebetween on that one of the faces of the base material.

A daylighting device in accordance with yet another aspect of the present invention preferably further includes light-scattering sections on at least one of the faces of the base material at locations corresponding to the daylighting sections, the light-scattering sections being configured to scatter light having transmitted through the daylighting sections.

In a daylighting device in accordance with still another aspect of the present invention, the daylighting sections preferably include light-scattering sections configured to scatter light incident to the daylighting sections.

In a daylighting device in accordance with yet still another aspect of the present invention, the light-diffusion section is preferably anisotropic with respect to light-scattering direction.

In a daylighting device in accordance with a further aspect of the present invention, the light-diffusion section preferably scatters therein light incident to the light-diffusion section.

In a daylighting device in accordance with yet a further aspect of the present invention, the base material preferably has such light-scattering properties as to scatter light having transmitted through the daylighting sections.

In a daylighting device in accordance with still a further aspect of the present invention, the base material is preferably anisotropic with respect to light-scattering direction.

In a daylighting device in accordance with yet still a further aspect of the present invention, the base material preferably scatters therein light incident to the base material.

In a daylighting device in accordance with an additional aspect of the present invention, the daylighting sections are preferably sewn onto the base material using a string-like member.

In a daylighting device in accordance with a further aspect of the present invention, the daylighting sections are preferably fixed to the base material via an adhesive agent.

In a daylighting device in accordance with a further aspect of the present invention, the light-scattering sections are preferably sewn onto the base material using a string-like member.

In a daylighting device in accordance with a further aspect of the present invention, the light-scattering sections are preferably fixed to the base material via an adhesive agent.

In a daylighting device in accordance with a further aspect of the present invention, the base material preferably has an end thereof fixed to a winding core so that the base material can be wound around the winding core.

A daylighting system in accordance with one aspect of the present invention includes: a daylighting device in accordance with one of aspects of the present invention; an interior lighting fixture; a detection unit configured to detect indoor brightness; and a control unit configured to control the interior lighting fixture and the detection unit.

Advantageous Effects of Invention

Some aspects of the present invention provide a daylighting device that can be wound without leaving empty space and a daylighting system incorporating such a daylighting device.

DESCRIPTION OF EMBODIMENTS

The following will describe embodiments of the daylighting device and the daylighting system of the present invention.

The embodiments disclosed herein serve solely to illustrate the spirit of the invention in a specific manner and unless otherwise mentioned, by no means limit the scope of the invention. In addition, the drawings used in the following description may in some cases show major parts in a scaled-up manner for convenience to enable better understanding of the features of the embodiments of the invention. The relative dimensions and related factors of the constituent elements may be out of proportion.

First Embodiment

Daylighting Device

Figure 1A:
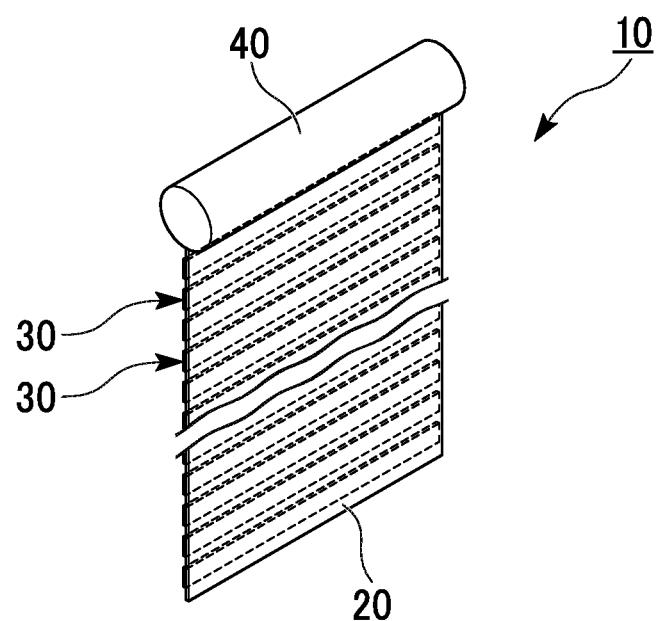
FIG. 1A is a schematic perspective view of a structure of a daylighting device in accordance with a first embodiment of the present invention.
Figure 1B:
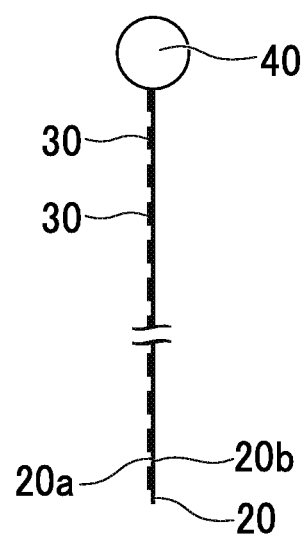
FIG. 1B is a schematic side view of the structure of the daylighting device in accordance with the first embodiment of the present invention.
Figure 1C:
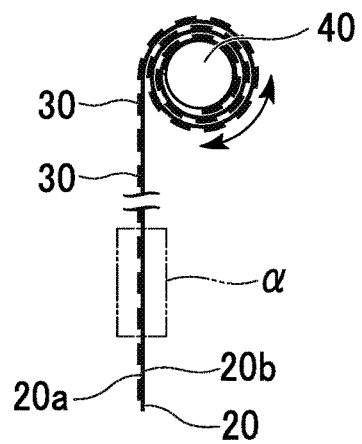
FIG. 1C is another schematic side view of the structure of the daylighting device in accordance with the first embodiment of the present invention.
Figure 2:
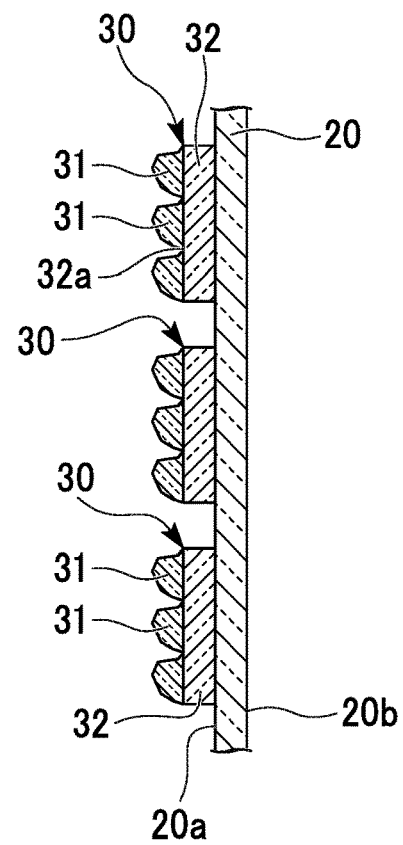
FIG. 2 is a schematic side view of the structure of the daylighting device in accordance with the first embodiment of the present invention, illustrating a portion denoted by α in FIG. 1C in a scaled-up manner.

FIGS. 1A to 1C are a perspective view, a side view, and another side view respectively schematically showing a structure of a daylighting device in accordance with a first embodiment of the present invention. FIG. 2 is a schematic side view of the structure of the daylighting device in accordance with the first embodiment of the present invention, illustrating a portion denoted by α in FIG. 1C in a scaled-up manner.

A daylighting device 10 in accordance with the present embodiment includes: a transparent and flexible base material 20; a plurality of transparent daylighting sections 30 on one of faces (i.e., a light-incident face, that is, an exterior face) 20a of the base material 20, each daylighting section 30 having protrusion portions 31 adjacent to each other; and a winding core 40 around which is wound the base material 20 having the daylighting sections 30 thereon.

As shown in FIG. 2, each daylighting section 30 includes a transparent support base material 32 and the transparent protrusion portions 31 disposed adjacent to each other on a face 32a of the support base material 32.

Each protrusion portion 31 is provided on the face 20a of the base material 20 so that its lengthwise direction is, for example, perpendicular to the heightwise direction of the window pane over which the daylighting device 10 is to be installed, in other words, perpendicular to the lengthwise direction of the base material 20. The protrusion portion 31 is polygonal (excluding triangular and quadrilateral) in a cross-sectional view thereof taken perpendicular to its lengthwise direction.

The daylighting sections 30 are provided on the face 20a of the base material 20 at predetermined intervals that run parallel to the lengthwise direction (winding direction) of the base material 20.

The base material 20 has an end thereof fixed to the winding core 40, so that the base material 20 having the daylighting sections 30 thereon can be wound around the winding core 40.

The base material 20 may be made of any material that is transparent and flexible. Examples include a triacetyl cellulose (TAC) film, a polyethylene terephthalate (PET) film, a cycloolefin polymer (COP) film, a polycarbonate (PC) film, a polyethylene naphthalate (PEN) film, a polyether sulfone (PES) film, a polyimide (PI) film, or a like transparent film (base material) or light-transmitting (low weaving density) fabric (cloth).

The base material 20 may contain, for example, an ultraviolet light absorber, an infrared light absorber, and/or the like in such a manner that these components do not impair the transparency (light-transmitting properties) and flexibility of the base material 20.

The base material 20 may also have various designs in such a manner that these designs do not impair the transparency (light-transmitting properties) and flexibility of the base material 20.

The daylighting sections 30 may be made of any transparent material. For example, the daylighting sections 30 may be made of the same material as the base material 20.

As described above, the daylighting device 10 of the present embodiment includes: the transparent and flexible base material 20; the transparent daylighting sections 30 on the face 20a of the base material 20, each daylighting section 30 having the protrusion portions 31 adjacent to each other; and the winding core 40 around which is wound the base material 20 having the daylighting sections 30 thereon. Therefore, the base material 20 having the daylighting sections 30 thereon can be wound around the winding core 40 without leaving empty space. In addition, in the daylighting device 10 of the present embodiment, the daylighting sections 30 are provided at predetermined intervals. Therefore, the base material 20 having the daylighting sections 30 thereon can be wound without leaving empty space with either the face 20a or another face (the face opposite the face 20a) 20b of the base material 20 tucked inside.

In the present embodiment, the daylighting sections 30 are disposed on the face (i.e., the light-incident face, that is, the exterior face) 20a of the base material 20 as an example. This is however by no means limiting the present invention. Alternatively, in the present invention, there may be provided daylighting sections on the other face (the face opposite the light-incident face, that is, the interior face) of the base material. As a further alternative, there may be provided daylighting sections on both faces of the base material in the present invention.

Additionally, in the present embodiment, the protrusion portions 31 are disposed on the face 32a of the support base material 32 as an example. This is however by no means limiting the present invention. Alternatively, in the present invention, there may be provided protrusion portions of the daylighting sections directly on at least one of faces of the transparent and flexible base material.

Additionally, in the present embodiment, the protrusion portions 31 are provided on the daylighting sections 30 as an example. This is however by no means limiting the present invention. Alternatively, in the present invention, there only need to be provided at least two protrusion portions adjacent to each other on each daylighting section.

Additionally, in the present embodiment, each protrusion portion 31 of the daylighting sections is polygonal in a cross-sectional view thereof taken perpendicular to its lengthwise direction as an example. This is however by no means limiting the present invention. Alternatively, in the present invention, each protrusion portion of the daylighting sections may be triangular or have a curved line in a cross-sectional view thereof taken perpendicular to its lengthwise direction.

Figure 3A:
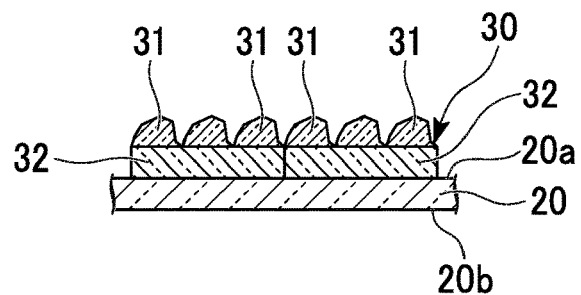
FIG. 3A is a schematic side view of the structure of the daylighting device in accordance with the first embodiment of the present invention.

Additionally, in the present embodiment, the daylighting sections 30 are provided on the face 20a of the base material 20 at predetermined intervals as an example. This is however by no means limiting the present embodiment. Alternatively, in the present embodiment, the daylighting sections 30 may be provided on the face 20a of the base material 20 without leaving empty space therebetween as shown in FIG. 3. When this is the case, the "face 20a of the base material 20" may be either the light-incident face or the face opposite the light-incident face.

Figure 3B:
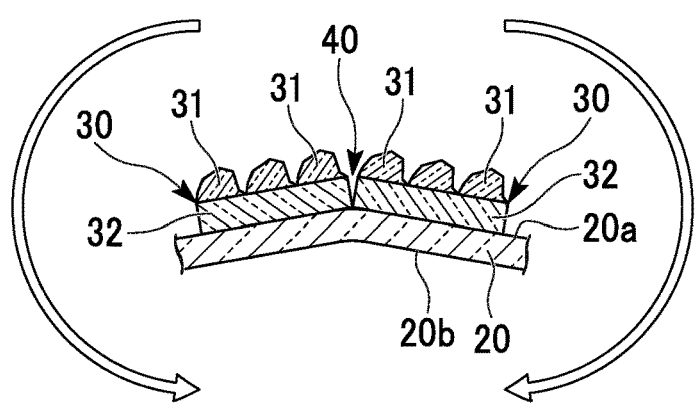
FIG. 3B is another schematic side view of the structure of the daylighting device in accordance with the first embodiment of the present invention.

If the daylighting sections 30 are provided on the face 20a of the base material 20 without leaving empty space therebetween, the base material 20 can be bent and wound so that the face (i.e., the other face 20b) opposite the face on which the daylighting sections 30 are provided is tucked inside as shown in FIG. 3B. When the base material 20 is bent so that the face (i.e., the other face 20b) opposite the face on which the daylighting sections 30 are provided is tucked inside as shown in FIG. 3B, there form gaps 40 between the daylighting sections 30, which enables the base material 20 having the daylighting sections 30 thereon to be wound without leaving empty space.

Figure 3C:
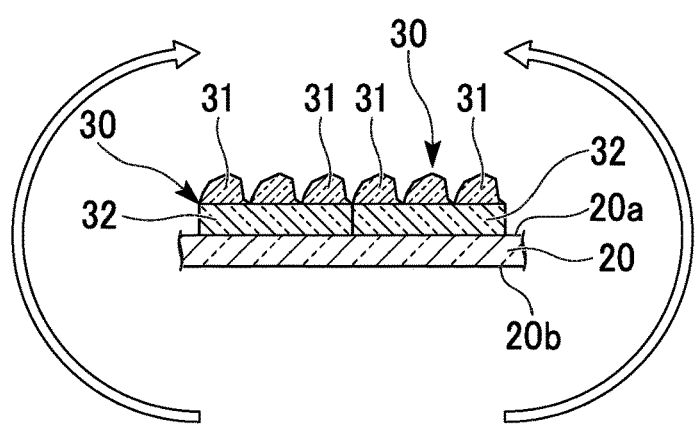
FIG. 3C is another schematic side view of the structure of the daylighting device in accordance with the first embodiment of the present invention.

On the other hand, if the base material 20 is bent so that the face on which the daylighting sections 30 are provided (i.e., the face 20a) is tucked inside as shown in FIG. 3C, the daylighting sections 30 interfere with each other, making it difficult to wind the base material 20 having the daylighting sections 30 thereon.

Figure 4A:
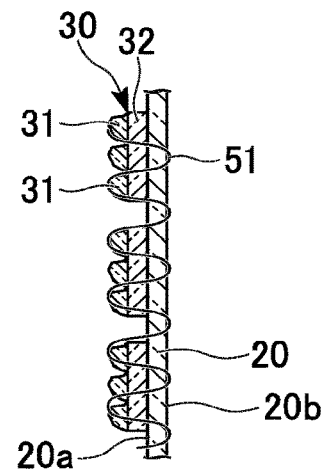
FIG. 4A is a schematic side view of the structure of the daylighting device in accordance with the first embodiment of the present invention.
Figure 4B:
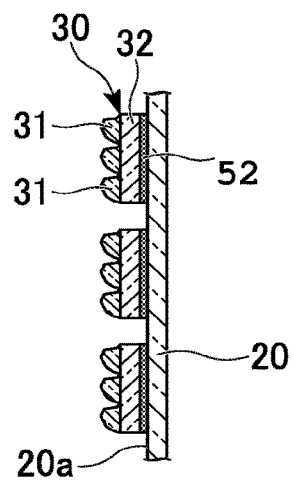
FIG. 4B is another schematic side view of the structure of the daylighting device in accordance with the first embodiment of the present invention.
Figure 4C:
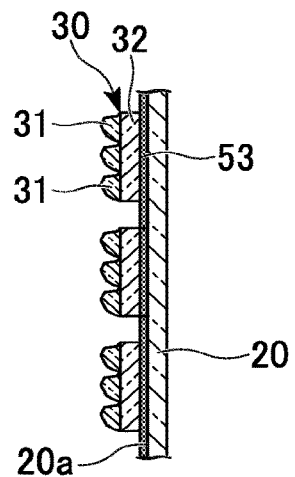
FIG. 4C is another schematic side view of the structure of the daylighting device in accordance with the first embodiment of the present invention.

Additionally, in the present embodiment, the daylighting sections 30 are provided directly on the face 20a of the base material 20 as an example. This is however by no means limiting the present embodiment. Alternatively, in the present embodiment, the daylighting sections 30 may be sewn onto the base material 20 using a string-like member 51 as shown in FIG. 4A. As a further alternative, the daylighting sections 30 may in the present embodiment be fixed via an adhesive agent 52 applied only between the daylighting sections 30 and the face 20a of the base material 20 as shown in FIG. 4B. As yet another alternative, the daylighting sections 30 may in the present embodiment be fixed via an adhesive agent 53 applied across the entire face 20a of the base material 20 as shown in FIG. 4C.

The adhesive agents 52 and 53 are not particularly limited so long as they are transparent.

Figure 5A:
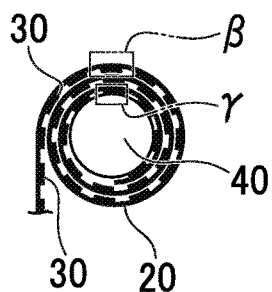
FIG. 5A is a schematic side view of the structure of the daylighting device in accordance with the first embodiment of the present invention.
Figure 5B:
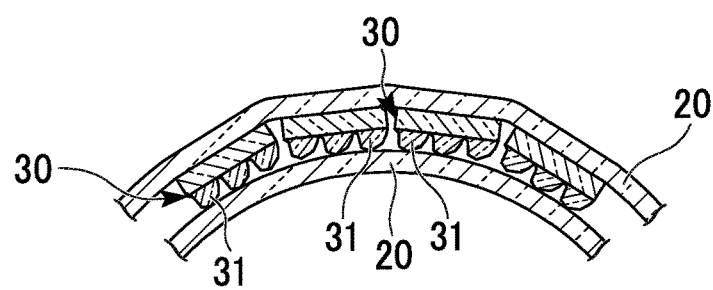
FIG. 5B is a schematic side view of a first structure of the daylighting device in accordance with the first embodiment of the present invention, illustrating a region denoted by β in FIG. 5A in a scaled-up manner.

Additionally, in the present embodiment, the daylighting sections 30 are separated from each other by a fixed distance (interval) as an example. This is however by no means limiting the present embodiment. Alternatively, the daylighting sections 30 may in the present embodiment be separated from each other by a relatively small distance (interval) on a portion, of the base material 20, that is far from the winding core 40 as shown in FIGS. 5B and 5D. The portion, of the base material 20, that is far from the winding core 40 can be wound around the winding core 40 without leaving empty space because of its increasing radius of curvature when wound, no matter whether the protrusion portions 31 of the daylighting sections 30 face the winding core 40 as shown in FIG. 5B, the protrusion portions 31 of the daylighting sections 30 face away from the winding core 40 as shown in FIG. 5D, or the daylighting sections 30 are separated from each other by a short distance (interval).

Figure 5C:
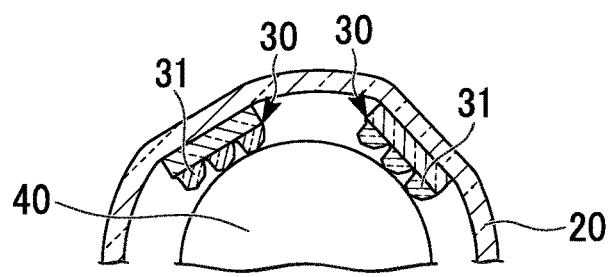
FIG. 5C is another schematic side view of the first structure of the daylighting device in accordance with the first embodiment of the present invention, illustrating a region denoted by γ in FIG. 5A in a scaled-up manner.
Figure 5D:
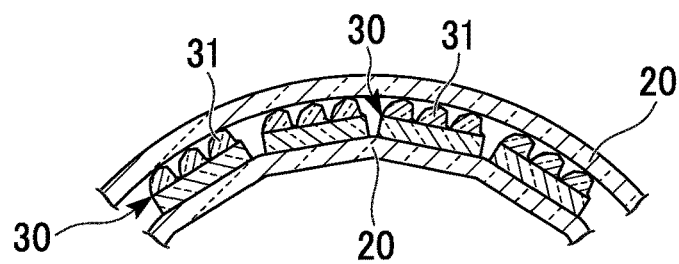
FIG. 5D is a schematic side view of a second structure of the daylighting device in accordance with the first embodiment of the present invention, illustrating a region denoted by β in FIG. 5A in a scaled-up manner.
Figure 5E:
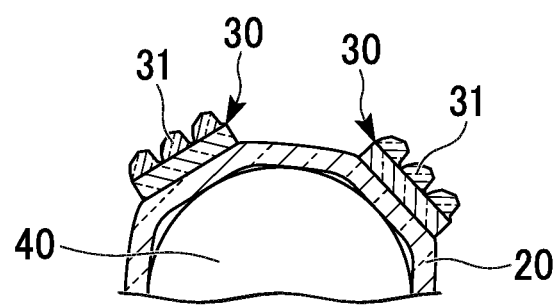
FIG. 5E is another schematic side view of the second structure of the daylighting device in accordance with the first embodiment of the present invention, illustrating a region denoted by γ in FIG. 5A in a scaled-up manner.

On the other hand, on a portion, of the base material 20, that is close to the winding core 40, the daylighting sections 30 may be separated from each other by a relatively long distance (interval) as shown in FIGS. 5C and 5E. The portion, of the base material 20, that is close to the winding core 40 can be wound around the winding core 40 without leaving empty space because of its decreasing radius of curvature when wound, no matter whether the protrusion portions 31 of the daylighting sections 30 face the winding core 40 as shown in FIG. 5B, the protrusion portions 31 of the daylighting sections 30 face away from the winding core 40 as shown in FIG. 5D, or the daylighting sections 30 are separated from each other by a short distance (interval). Note that the daylighting sections 30 need to be separated from each other by a relatively long distance (interval) on the portion, of the base material 20, that is close to the winding core 40, so that the daylighting sections 30 do not interfere with each other.

Method of Manufacturing Daylighting Device

The following will describe an exemplary method of manufacturing a daylighting device of the present embodiment in reference to FIGS. 6 to 8C.

A resin sheet is fabricated that will become a daylighting section 30. The resin sheet is fabricated, for example, by either of the two methods described below.

Figure 6:
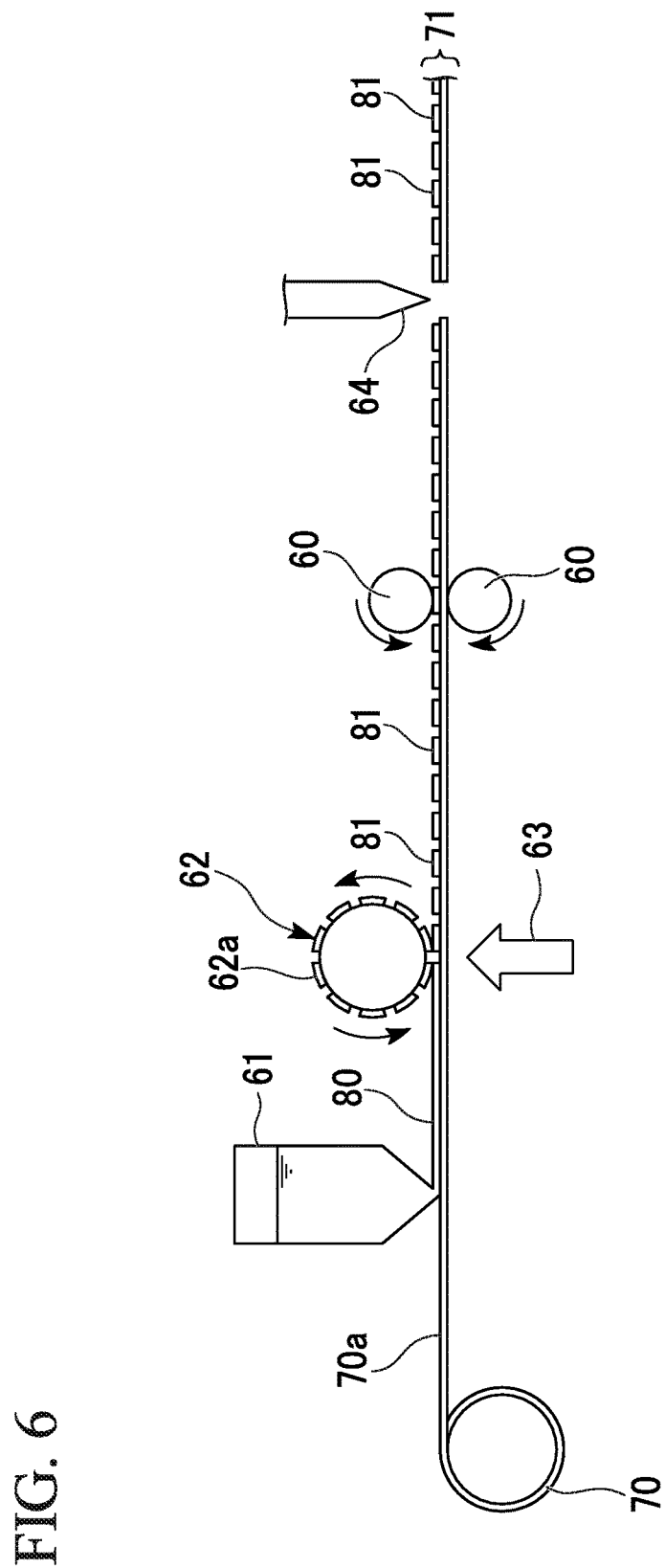
FIG. 6 is a schematic diagram illustrating a method of manufacturing the daylighting device in accordance with the first embodiment of the present invention.

In a first method, a pair of rollers 60 and 60 is rotated to unwind a roll of resin sheet 70 for feeding as shown in FIG. 6.

The resin sheet 70 is made of the same material as a base material 20.

Next, a photocuring resin 80 is applied using a resin application machine 61 to one of faces 70a of the resin sheet 70.

Next, the photocuring resin 80 is pressed under a transfer face 62a of a rotating transfer roll metal die 62. Simultaneously, the photocuring resin 80 is irradiated with light 63 such as ultraviolet light. This process transfers the irregular shape of the transfer face 62a of the transfer roll metal die 62 onto the photocuring resin 80 along the lengthwise direction of the resin sheet 70, thereby forming protrusion portions 81 composed of the photocuring resin 80 on the face 70a of the resin sheet 70.

Next, the resin sheet 70 on which the protrusion portions 81 have been formed is cut perpendicular to the lengthwise direction of the resin sheet 70 using a cutting machine 64, to form a resin sheet 71 having formed on one of faces thereof the protrusion portions 81 of a predetermined length (size).

Figure 7A:
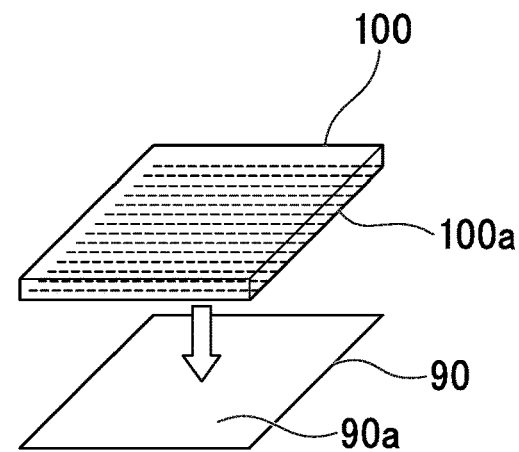
FIG. 7A is a schematic perspective view illustrating the method of manufacturing the daylighting device in accordance with the first embodiment of the present invention.

In a second method, first of all, a metal die 100 having an irregular shape formed on one of faces (transfer face) 100a thereof is placed on a resin base material 90 as shown in FIG. 7A.

The resin base material 90 is, for example, either a base material A composed of a transparent thermosetting resin or a base material B including a transparent resin base material and a curing layer composed of a transparent photocuring resin formed on a face of the transparent resin base material.

Figure 7B:
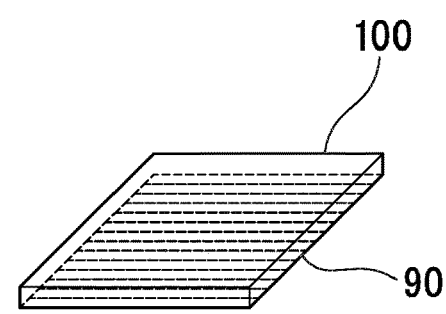
FIG. 7B is another schematic perspective view of the method of manufacturing the daylighting device in accordance with the first embodiment of the present invention.
Figure 7C:
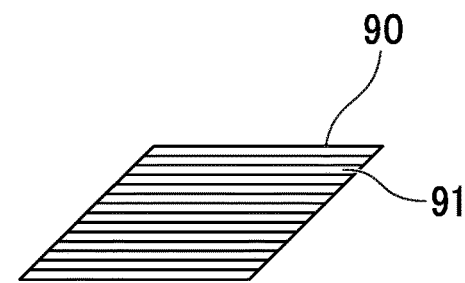
FIG. 7C is another schematic perspective view of the method of manufacturing the daylighting device in accordance with the first embodiment of the present invention.

Next, as shown in FIG. 7B, the transfer face 100a of the metal die 100 is pressed to one of faces 90a of the resin base material 90 to transfer the irregular shape of the transfer face 100a of the metal die 100 onto the face 90a of the resin base material 90. Where the base material B is used as the resin base material 90, the transfer face 100a of the metal die 100 is pressed to the curing layer to transfer the irregular shape of the transfer face 100a of the metal die 100 onto the curing layer.

Where the base material A is used as the resin base material 90, the resin base material 90 is heated while being pressed under the metal die 100. Consequently, the irregular shape of the metal die 100 having been transferred to the face 90a of the resin base material 90 is fixed, thereby forming protrusion portions 91 on the face 90a of the resin base material 90 as shown in FIG. 7C.

Referring again to the case where the base material B is used as the resin base material 90, the resin base material 90 is irradiated with light such as ultraviolet light while being pressed under the metal die 100. Consequently, the irregular shape of the metal die 100 having been transferred to the face 90a of the resin base material 90 is fixed, thereby forming the protrusion portions 91 on the face 90a (curing layer) of the resin base material 90 as shown in FIG. 7C.

Figure 8A:
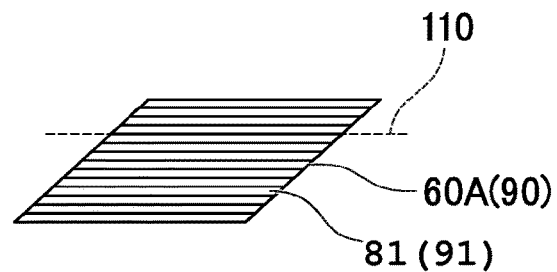
FIG. 8A is a schematic perspective view of the method of manufacturing the daylighting device in accordance with the first embodiment of the present invention.
Figure 8B:
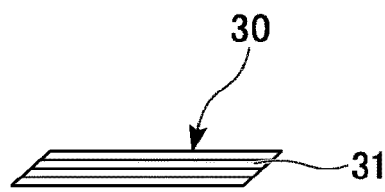
FIG. 8B is another schematic perspective view of the method of manufacturing the daylighting device in accordance with the first embodiment of the present invention.

Next, the resin sheet 71 on which the protrusion portions 81 have been formed or the resin base material 90 on which the protrusion portions 91 have been formed is cut along the lengthwise direction of the protrusion portions 81 or the protrusion portions 91 (e.g., along a broken line 110) as shown in FIG. 8A, to form a daylighting section 30 having formed thereon protrusion portions 31 of a predetermined length (size) as shown in FIG. 8B.

Figure 8C:
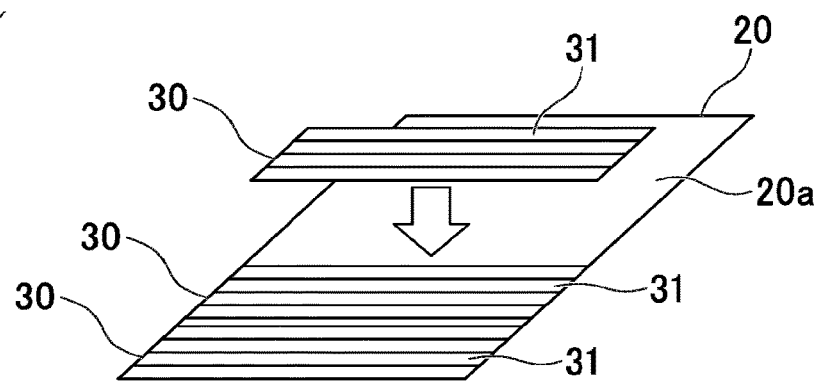
FIG. 8C is another schematic perspective view of the method of manufacturing the daylighting device in accordance with the first embodiment of the present invention.

A plurality of daylighting sections 30 is then disposed on a face 20a of the base material 20 as shown in FIG. 8C, thereby obtaining a daylighting device 10.

The daylighting sections 30 are provided on the face 20a of the base material 20 in such a manner that the protrusion portions 31 have their lengthwise direction perpendicular to the lengthwise direction of the base material 20.

Second Embodiment

Daylighting Device

Figure 9:
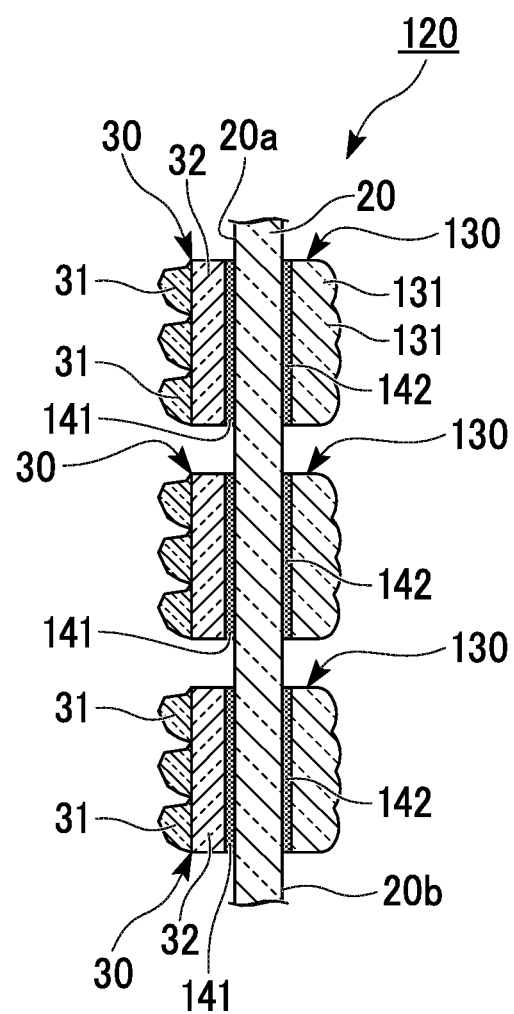
FIG. 9 is a schematic side view of a structure of a daylighting device in accordance with a second embodiment of the present invention.

FIG. 9 is a schematic side view of a structure of a daylighting device in accordance with a second embodiment of the present invention. Those members shown in FIG. 9 which are the same as those in the daylighting device of the first embodiment shown in FIG. 2 are indicated by the same reference signs or numerals, and description thereof is omitted.

A daylighting device 120 in accordance with the present embodiment includes: a transparent and flexible base material 20; a plurality of transparent daylighting sections 30 on one of faces 20a of the base material 20, each daylighting section 30 having protrusion portions 31 adjacent to each other; light-scattering sections 130 on another face 20b of the base material 20 opposite the daylighting sections 30, the light-scattering sections 130 scattering the light having transmitted through the daylighting sections 30; and a winding core (not shown) around which is wound the base material 20 having the daylighting sections 30 thereon.

The daylighting sections 30 are fixed via an adhesive agent 141 applied to the face 20a of the base material 20. The light-scattering sections 130 are fixed via an adhesive agent 142 applied to the face 20b of the base material 20.

The adhesive agent 141 is not particularly limited so long as it is transparent.

The light-scattering sections 130 have a plurality of protrusion portions 131 adjacent to each other.

If there are provided the daylighting sections 30 alone as in the daylighting device 10 of the first embodiment, light can only illuminate a small indoor area, and unwanted glaring light can occur. In view of this situation, the daylighting device 120 of the present embodiment has, on the (other) face 20b of the base material 20 opposite the daylighting sections 30, the light-scattering sections 130 in order to scatter the light having transmitted through the daylighting sections 30. Therefore, the daylighting device 120 is capable of spreading outgoing light over a wide area, thereby illuminating a wide indoor area and mitigating glare.

In the present embodiment, the daylighting sections 30 and the light-scattering sections 130 have almost equal footprints on the face 20a and the face 20b of the base material 20 respectively as an example. This is however by no means limiting the present invention. Alternatively, in the present invention, the daylighting sections and the light-scattering sections may have different footprints on the respective faces of the base material.

The light-scattering sections 130 may scatter light either isotropically or anisotropically. If the light-scattering sections 130 scatter light anisotropically, light can be spread (diffused) without adding to the glare.

In addition, in the present embodiment, the light-scattering sections 130 are provided directly on the (other) face 20b of the base material 20 as an example. This is however by no means limiting the present invention. Alternatively, in the present invention, the light-scattering sections may be sewn onto the base material using a string-like member. As a further alternative, the light-scattering sections may in the present invention be fixed via an adhesive agent applied only between the light-scattering sections and the (other) face of the base material. As yet another alternative, the light-scattering sections may in the present invention be fixed via an adhesive agent applied across the entire (other) face of the base material.

The adhesive agents for fixing the light-scattering sections are not particularly limited so long as they are transparent.

Third Embodiment

Daylighting Device

Figure 10:
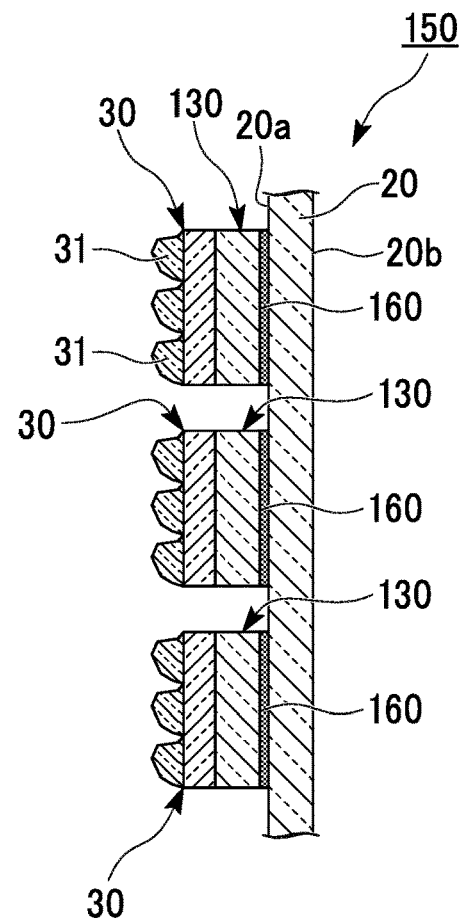
FIG. 10 is a schematic side view of a structure of a daylighting device in accordance with a third embodiment of the present invention.

FIG. 10 is a schematic side view of a structure of a daylighting device in accordance with a third embodiment of the present invention. Those members shown in FIG. 10 which are the same as those in the daylighting device of the first embodiment shown in FIGS. 1A to 1C or the daylighting device of the second embodiment shown in FIG. 9 are indicated by the same reference signs or numerals, and description thereof is omitted.

A daylighting device 150 in accordance with the present embodiment includes: a transparent and flexible base material 20; a plurality of transparent daylighting sections 30 on one of faces 20a of the base material 20, each daylighting section 30 having protrusion portions 31 adjacent to each other; light-scattering sections 130 on the face 20a of the base material 20 between the base material 20 and the daylighting sections 30, the light-scattering sections 130 scattering the light having transmitted through the daylighting sections 30; and a winding core (not shown) around which is wound the base material 20 having the daylighting sections 30 thereon.

In the daylighting device 150 of the present embodiment, the daylighting sections 30 and the light-scattering sections 130 are stacked to form integral layered bodies that are fixed via an adhesive agent 160 applied to the face 20a of the base material 20.

The adhesive agent 160 is not particularly limited so long as it is transparent.

Figure 11:
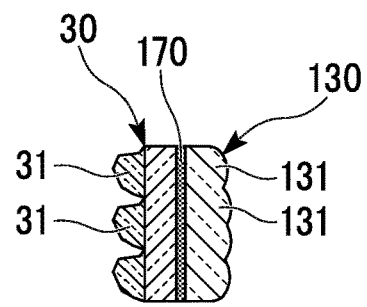
FIG. 11 is another schematic side view of the structure of the daylighting device in accordance with the third embodiment of the present invention.

The daylighting sections 30 and the light-scattering sections 130 may be stacked via an adhesive agent 170 as shown in FIG. 11.

Figure 12:
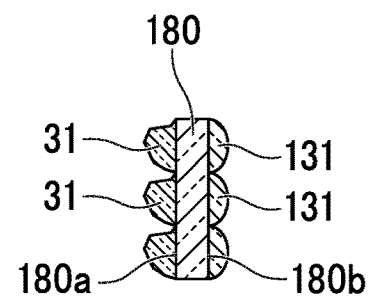
FIG. 12 is another schematic side view of the structure of the daylighting device in accordance with the third embodiment of the present invention.

An alternative to this structure is shown in FIG. 12, where the protrusion portions 31 of the daylighting sections 30 are provided alone on one of faces 180a of a transparent base material 180, protrusion portions 131 of the light-scattering sections 130 are provided alone on another face 180b of the base material 180, and the daylighting sections 30 and the light-scattering sections 130 are stacked to form integral layered bodies.

In the daylighting device 150 of the present embodiment, the light-scattering sections 130 are provided on another face 20b of the base material 20 opposite the daylighting sections 30 in order to scatter the light having transmitted through the daylighting sections 30. Therefore, the daylighting device 150 is capable of spreading outgoing light over a wide area, thereby illuminating a wide indoor area and mitigating glare.

Fourth Embodiment

Daylighting Device

Figure 13:
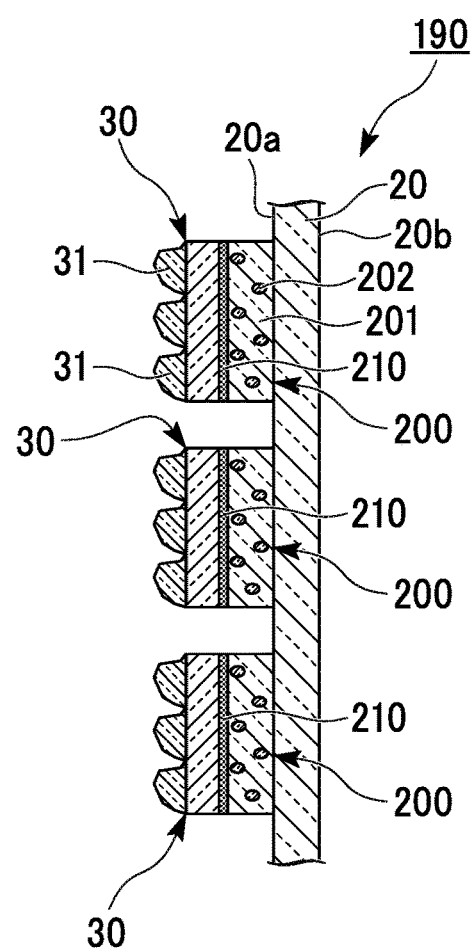
FIG. 13 is a schematic side view of a structure of a daylighting device in accordance with a fourth embodiment of the present invention.

FIG. 13 is a schematic side view of a structure of a daylighting device in accordance with a fourth embodiment of the present invention. Those members shown in FIG. 13 which are the same as those in the daylighting device of the first embodiment shown in FIGS. 1A to 1C are indicated by the same reference signs or numerals, and description thereof is omitted.

A daylighting device 190 in accordance with the present embodiment includes: a transparent and flexible base material 20; a plurality of transparent daylighting sections 30 on one of faces 20a of the base material 20, each daylighting section 30 having protrusion portions 31 adjacent to each other, light-scattering sections 200 on the face 20a of the base material 20 between the base material 20 and the daylighting sections 30, the light-scattering sections 200 scattering the light having transmitted through the daylighting sections 30; and a winding core (not shown) around which is wound the base material 20 having the daylighting sections 30 thereon.

In the daylighting device 190 of the present embodiment, the daylighting sections 30 and the light-scattering sections 200 are stacked via an adhesive agent 210 to form integral layered bodies that are fixed to the face 20a of the base material 20.

The adhesive agent 210 is not particularly limited so long as it is transparent.

Each light-scattering section 200 is composed of, for example, an anisotropically diffusive, adhesive film that includes an adhesive layer 201 composed of a transparent adhesive agent containing numerous acicular fillers 202.

The numerous fillers 202 are oriented in a single direction in the adhesive layer 201. As an example, the numerous fillers 202 in FIG. 13 are oriented perpendicular to the lengthwise direction of the base material 20.

Due to this orientation of the fillers 202, the light having transmitted through the daylighting sections 30 and then entered the light-scattering sections 200 can be diffused (scattered) perpendicular to the orientation direction of the fillers 202.

In the daylighting device 190 of the present embodiment, the light-scattering sections 200 are provided on the face 20a of the base material 20 opposite the daylighting sections 30 in order to scatter the light having transmitted through the daylighting sections 30. Therefore, the daylighting device 190 is capable of spreading outgoing light over a wide area, thereby illuminating a wide indoor area and mitigating glare.

Method of Manufacturing Daylighting Device

The following will describe an exemplary method of manufacturing a daylighting device of the present embodiment in reference to FIGS. 14A, 14B, and 15A to 15D.

A resin sheet is fabricated that will become a layered body of a daylighting section 30 and a light-scattering section 200. The resin sheet is fabricated, for example, by either of the two methods described below.

Figure 14A:
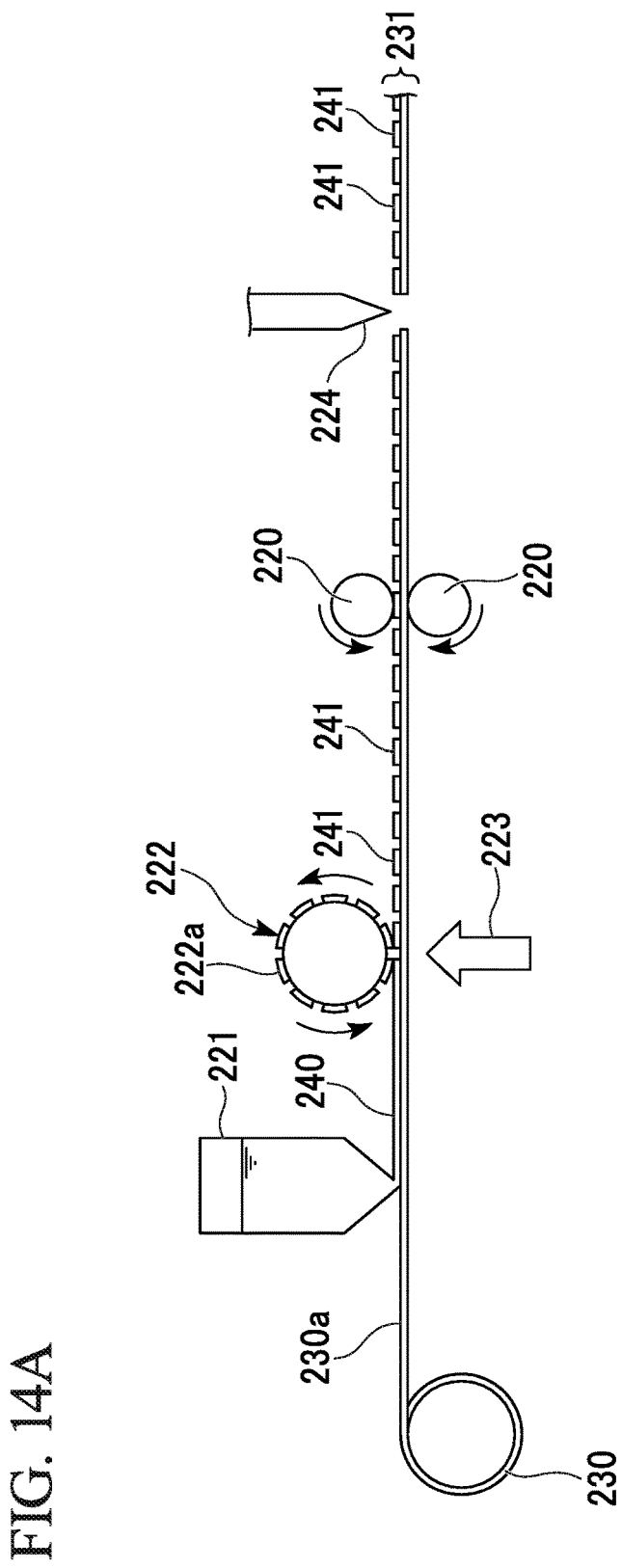
FIG. 14A is a schematic diagram illustrating a method (steps) of manufacturing the daylighting device in accordance with the fourth embodiment of the present invention.

In a first method, a pair of rollers 220 and 220 is rotated to unwind a roll of resin sheet 230 for feeding as shown in FIG. 14A.

Figure 14B:
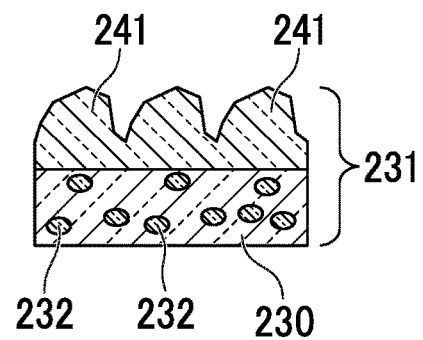
FIG. 14B is a schematic cross-sectional view of a resin sheet formed in the daylighting device in accordance with the fourth embodiment of the present invention by the manufacturing method.

The resin sheet 230 is a sheet made of the same material as a base material 20 and containing numerous acicular fillers 232 as shown in FIG. 14B.

Next, a photocuring resin 240 is applied using a resin application machine 221 to one of faces 230a of the resin sheet 230.

Next, the photocuring resin 240 is pressed under a transfer face 222a of a rotating transfer roll metal die 222. Simultaneously, the photocuring resin 240 is irradiated with light 223 such as ultraviolet light. This process transfers the irregular shape of the transfer face 222a of the transfer roll metal die 222 onto the photocuring resin 240 along the lengthwise direction of the resin sheet 240, thereby forming protrusion portions 241 composed of the photocuring resin 240 on the face 230a of the resin sheet 230. An adhesive sheet may be attached to a face of the resin sheet 230 on which there are provided no protrusion portions 241.

Next, the resin sheet 230 on which the protrusion portions 241 have been formed is cut perpendicular to the lengthwise direction of the resin sheet 230 using a cutting machine 224, to form a resin sheet 231 having formed on one of sides thereof the protrusion portions 241 of a predetermined length (size) and including the resin sheet 230 containing numerous fillers 232 as shown in FIG. 14B.

Figure 15A:
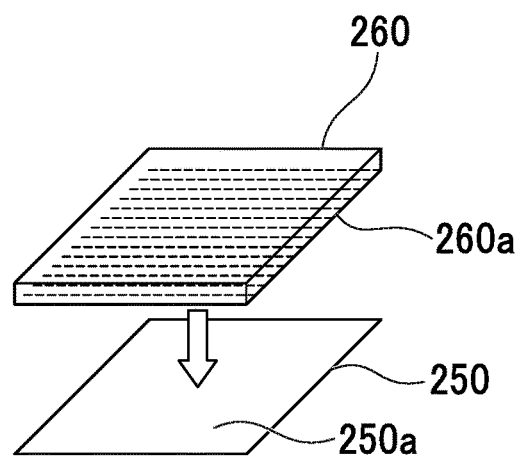
FIG. 15A is a schematic perspective view illustrating the method (steps) of manufacturing the daylighting device in accordance with the fourth embodiment of the present invention.

In a second method, first of all, a metal die 260 having an irregular shape formed on one of faces (transfer face) 260a thereof is placed on a resin base material 250 as shown in FIG. 15A.

The resin base material 250 is, for example, either a base material C composed of a transparent thermosetting resin and containing numerous acicular fillers primarily near one of the faces thereof or a base material D including on a face of a transparent resin base material a curing layer that is composed of a transparent photocuring resin and contains numerous acicular fillers.

Figure 15B:
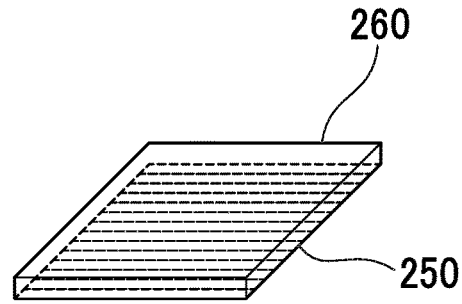
FIG. 15B is another schematic perspective view illustrating the method (steps) of manufacturing the daylighting device in accordance with the fourth embodiment of the present invention.
Figure 15C:
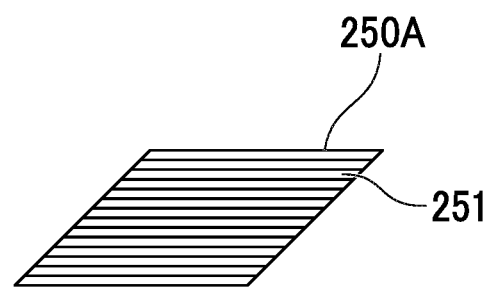
FIG. 15C is another schematic perspective view illustrating the method (steps) of manufacturing the daylighting device in accordance with the fourth embodiment of the present invention.

Next, as shown in FIG. 15B, a transfer face 260a of the metal die 260 is pressed to the face 250a of the resin base material 250a to transfer the irregular shape of the transfer face 260a of the metal die 260 onto the face 250a of the resin base material 250. Where the base material D is used as the resin base material 250, the transfer face 260a of the metal die 260 is pressed to the curing layer to transfer the irregular shape of the transfer face 260a of the metal die 260 onto the curing layer.

Where the base material C is used as the resin base material 250, the resin base material 250 is heated while the face of the resin base material 250 near which a relatively small number of acicular fillers are contained is being pressed by the transfer face 260a of the metal die 260. Consequently, the irregular shape of the metal die 260 having been transferred to the face 250a of the resin base material 250 is fixed, thereby forming protrusion portions 251 on the face 250a of the resin base material 250 as shown in FIG. 15C.

Referring again to the case where the base material D is used as the resin base material 250, the resin base material 250 is irradiated with light such as ultraviolet light while being pressed under the metal die 260. Consequently, the irregular shape of the metal die 260 having been transferred to the face 250a of the resin base material 250 is fixed, thereby forming the protrusion portions 251 on the face 250a (curing layer) of the resin base material 250 as shown in FIG. 15C.

Figure 15D:
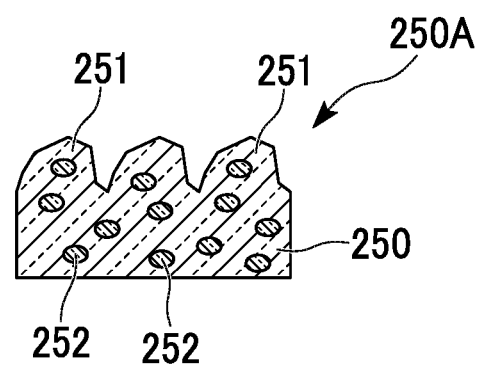
FIG. 15D is a schematic cross-sectional view of a resin sheet formed in the daylighting device in accordance with the fourth embodiment of the present invention by the manufacturing method.

A resin sheet 250A is thus formed that, as shown in FIG. 15D, includes a stack of a daylighting section having formed on one of faces thereof the protrusion portions 251 of a predetermined length (size) and a light-scattering section containing the numerous acicular fillers 252.

A plurality of daylighting sections 30 is then disposed on a face 20a of the base material 20 similarly to the first embodiment, thereby obtaining a daylighting device 190.

Fifth Embodiment

Daylighting Device

Figure 16:
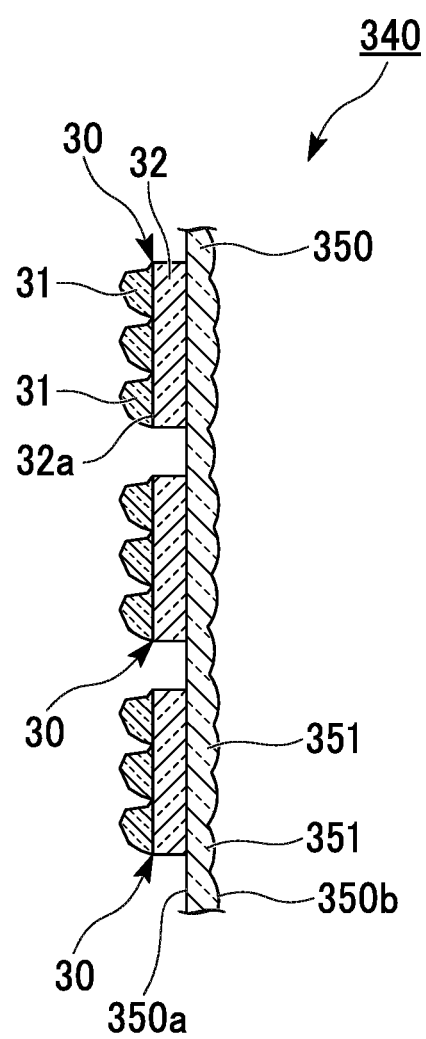
FIG. 16 is a schematic side view of a structure of a daylighting device in accordance with a fifth embodiment of the present invention.

FIG. 16 is a schematic side view of a structure of a daylighting device in accordance with a fifth embodiment of the present invention. Those members shown in FIG. 16 which are the same as those in the daylighting device of the first embodiment shown in FIG. 2 are indicated by the same reference signs or numerals, and description thereof is omitted.

A daylighting device 340 in accordance with the present embodiment includes: a transparent and flexible base material 350; a plurality of transparent daylighting sections 30 on one of faces (i.e., a light-incident face, that is, an exterior face) 350a of the base material 350, each daylighting section 30 having protrusion portions 31 adjacent to each other; and a winding core (not shown) around which is wound the base material 350 having the daylighting sections 30 thereon.

The base material 350 has on another face 350b thereof a plurality of protrusion portions (light-scattering sections) 351 adjacent to each other. The protrusion portions 351 on the base material 350 have such light-scattering properties as to scatter the light having transmitted through the daylighting sections 30.

The daylighting device 340 of the present embodiment has the protrusion portions 351 on the (other) face 350b of the base material 350 in order to scatter the light having transmitted through the daylighting sections 30. Therefore, the daylighting device 340 is capable of spreading outgoing light over a wide area, thereby illuminating a wide indoor area and mitigating glare.

The protrusion portions 351 may scatter light either isotropically or anisotropically. If the protrusion portions 351 scatter light anisotropically, light can be spread (diffused) without adding to the glare.

Sixth Embodiment

Daylighting Device

Figure 17:
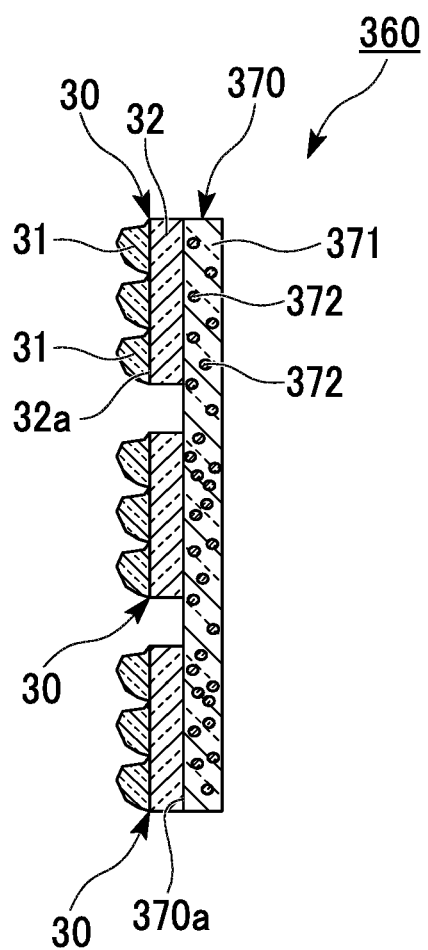
FIG. 17 is a schematic side view of a structure of a daylighting device in accordance with a sixth embodiment of the present invention.

FIG. 17 is a schematic side view of a structure of a daylighting device in accordance with a sixth embodiment of the present invention. Those members shown in FIG. 17 which are the same as those in the daylighting device of the first embodiment shown in FIG. 2 are indicated by the same reference signs or numerals, and description thereof is omitted.

A daylighting device 360 in accordance with the present embodiment includes: a transparent and flexible base material 370; a plurality of transparent daylighting sections 30 on one of faces (i.e., a light-incident face, that is, an exterior face) 370a of the base material 370, each daylighting section 30 having protrusion portions 31 adjacent to each other; and a winding core (not shown) around which is wound the base material 370 having the daylighting sections 30 thereon.

The base material 370 is composed of, for example, an anisotropically diffusive film that includes a resin layer 371 composed of a transparent resin containing numerous acicular fillers 372.

The numerous fillers 372 are oriented in a single direction in the resin layer 371. As an example, the numerous fillers 372 in FIG. 17 are oriented perpendicular to the lengthwise direction of the base material 370. Due to this orientation of the fillers 372, the light having transmitted through the daylighting sections 30 and then entered the base material 370 can be diffused (scattered) perpendicular to the orientation direction of the fillers 372 in the base material 370.

In the daylighting device 360 of the present embodiment, the base material 370 is composed of an anisotropically diffusive film that includes the resin layer 371 containing the numerous acicular fillers 372 therein. Therefore, the daylighting device 360 is capable of spreading outgoing light, which has transmitted through the daylighting sections 30 and then entered the base material 370, over a wide area, thereby illuminating a wide indoor area and mitigating glare.

Seventh Embodiment

Daylighting Device

Figure 18A:
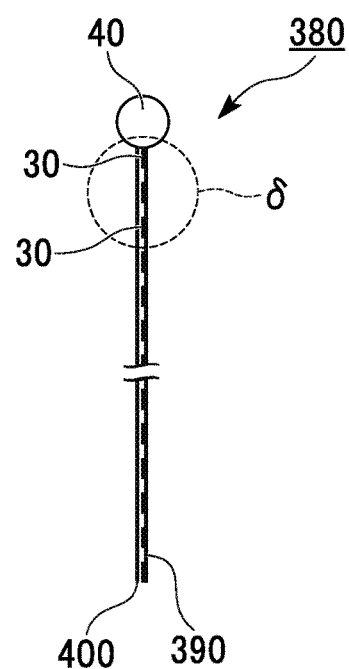
FIG. 18A is a schematic side view of a structure of a daylighting device in accordance with a seventh embodiment of the present invention.
Figure 18B:
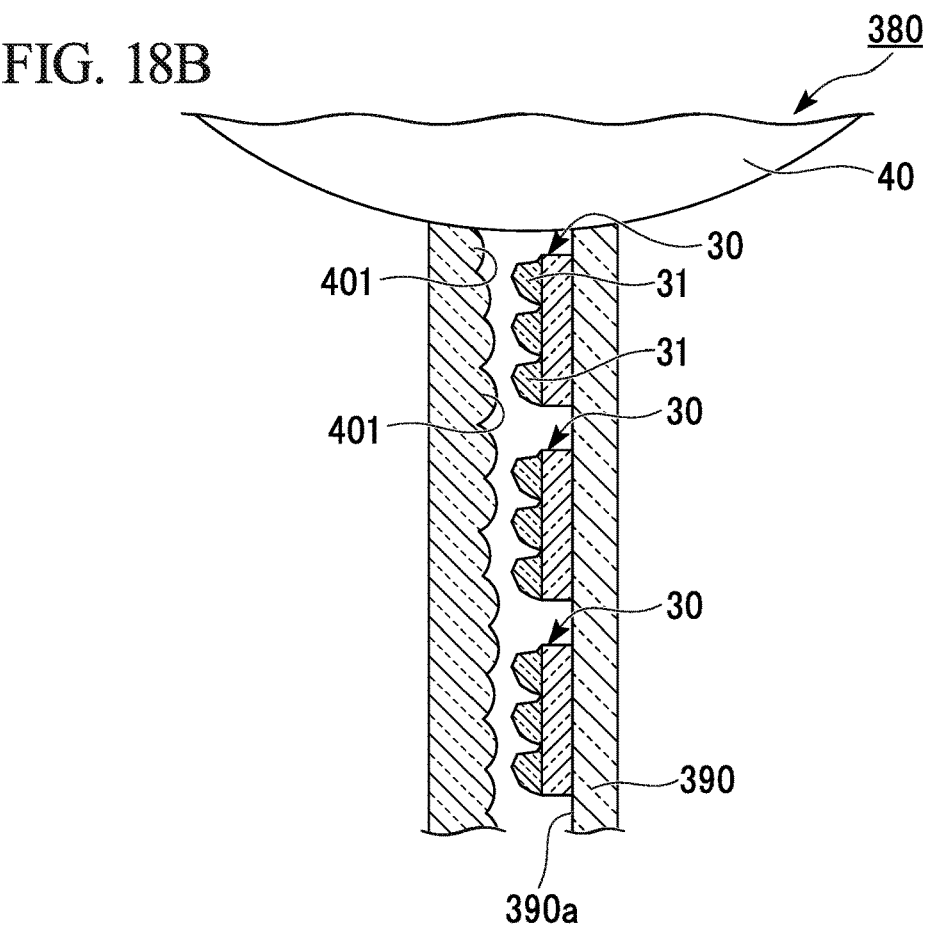
FIG. 18B is another schematic side view of the structure of the daylighting device in accordance with the seventh embodiment of the present invention, illustrating a portion denoted by δ in FIG. 18A in a scaled-up manner.

FIGS. 18A and 18B are schematic side views of a structure of a daylighting device in accordance with a seventh embodiment of the present invention. FIG. 18B illustrates a portion denoted by δ in FIG. 18A in a scaled-up manner. Those members shown in FIGS. 18A and 18B which are the same as those in the daylighting device of the first embodiment shown in FIGS. 1A to 1C and 2 are indicated by the same reference signs or numerals, and description thereof is omitted.

A daylighting device 380 in accordance with the present embodiment includes: a transparent and flexible base material 390; a plurality of transparent daylighting sections 30 on one of faces (i.e., a light-incident face, that is, an exterior face) 390a of the base material 390, each daylighting section 30 having protrusion portions 31 adjacent to each other; a light-diffusion sheet 400 having a plurality of protrusion portions (light-scattering sections) 401 adjacent to each other and placed against the face 390a of the base material 390 so that the protrusion portions 401 can face the daylighting sections 30; and a winding core 40 around which are wound the light-diffusion sheet 400 and the base material 390 having the daylighting sections 30 thereon.

The base material 390 has an end thereof fixed to the winding core 40, and so does the light-diffusion sheet 400. Therefore, the base material 390 having the daylighting sections 30 thereon and the light-diffusion sheet 400 having the protrusion portions 401 thereon can be wound around the winding core 40. The base material 390 and the light-diffusion sheet 400 are fixed independently to the winding core 40.

The light-diffusion sheet 400 is provided closer to the exterior than is the base material 390. The protrusion portions 401 on the light-diffusion sheet 400 have such light-scattering properties as to reduce variations of the angle of incidence of the light entering the light-diffusion sheet 400 before the light enters the daylighting sections 30.

Where the light-diffusion sheet 400 is provided closer to the exterior than is the base material 390, the light-diffusion sheet 400 may include an ultraviolet light absorber. The inclusion of the absorber would protect the daylighting sections 30 from ultraviolet light and prevents the daylighting sections 30 from being degraded under ultraviolet light.

In the daylighting device 380 of the present embodiment, the light-diffusion sheet 400 having the protrusion portions 401 thereon is provided closer to the exterior than is the base material 390 having the daylighting sections 30 thereon, and the light-diffusion sheet 400 is disposed to face the base material 390 so that the protrusion portions 401 can face the daylighting sections 30. Therefore, the protrusion portions 401 reduce variations of the angle of incidence of the outdoor light entering the light-diffusion sheet 400 before the light enters the daylighting sections 30, thereby mitigating glare. In addition, the light-diffusion sheet 400 is placed against the face (face 390a) of the base material 390 on which the daylighting sections 30 are provided. Therefore, the daylighting sections 30 are prevented from being damaged by exposure.

In the present embodiment, the light-diffusion sheet 400 having the protrusion portions 401 thereon is provided closer to the exterior than is the base material 390 having the daylighting sections 30 thereon as an example. This is however by no means limiting the present invention. Alternatively, in the present invention, the light-diffusion sheet having protrusion portions thereon may be provided closer to the interior than is the base material having daylighting sections thereon. This structure is capable of spreading outgoing light, which has transmitted through the daylighting sections, over a wide area, thereby illuminating a wide indoor area.

In addition, in the present embodiment, the base material 390 and the light-diffusion sheet 400 are fixed independently to the winding core 40 as an example. This is however by no means limiting the present invention. Alternatively, in the present invention, the light-diffusion sheet having protrusion portions thereon may be fixed to the base material having daylighting sections thereon via an adhesive tape, an adhesive agent, or the like.

Eighth Embodiment

Daylighting Device

Figure 19A:
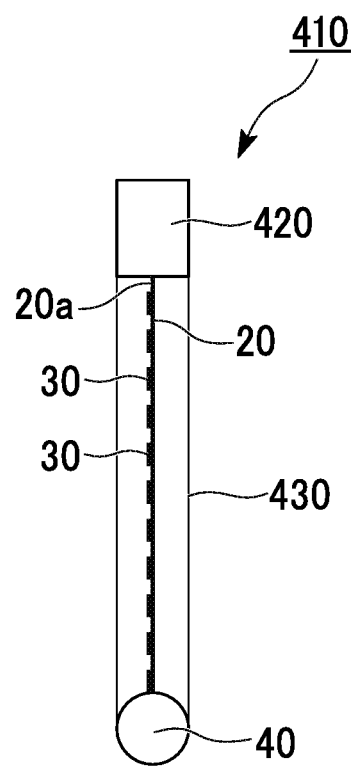
FIG. 19A is a schematic side view of a structure of a daylighting device in accordance with an eighth embodiment of the present invention when the daylighting device is unwound.
Figure 19B:
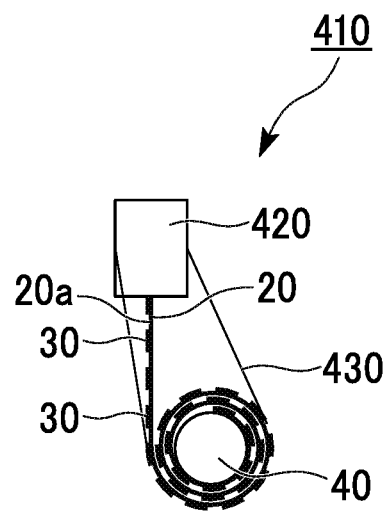
FIG. 19B is another schematic side view of the structure of the daylighting device in accordance with the eighth embodiment of the present invention when the daylighting device is wound up.

FIGS. 19A and 19B are schematic side views of a structure of a daylighting device in accordance with an eighth embodiment of the present invention. FIG. 19A illustrates the daylighting device when it is unwound, whereas FIG. 19B illustrates the daylighting device when it is wound up. Those members shown in FIGS. 19A and 19B which are the same as those in the daylighting device of the first embodiment shown in FIGS. 1A to 1C are indicated by the same reference signs or numerals, and description thereof is omitted.

A daylighting device 410 in accordance with the present embodiment includes: a transparent and flexible base material 20; a plurality of transparent daylighting sections 30 on one of faces (i.e., a light-incident face, that is, an exterior face) 20a of the base material 20, each daylighting section 30 having protrusion portions adjacent to each other; a winding core 40 around which is wound the base material 20 having the daylighting sections 30 thereon; a secure hanging metal fixture 420 to which is fixed an end (second end) of the base material 20 opposite another end (first end) of the base material 20 where the base material 20 is fixed to the winding core 40; and a winding string 430 used to wind up the base material 20.

In the daylighting device 410 of the present embodiment, the winding core 40, connected to the first end of the base material 20, is placed over the lower part of the window pane over which the daylighting device 410 is to be installed (near the room floor), whereas the secure hanging metal fixture 420, connected to the second end of the base material 20, is placed over the upper part of the window pane (near the room ceiling).

The winding string 430 has both ends thereof fixed to the secure hanging metal fixture 420 and hangs down, forming a loop, over the lower part of the window pane over which the daylighting device 410 is to be installed. The winding core 40 and the base material 20 having the daylighting sections 30 thereon are inserted through the loop formed by the winding string 430. The winding core 40 and the base material 20 having the daylighting sections 30 thereon are hence supported by the loop formed by the winding string 430.

In the daylighting device 410 of the present embodiment, the winding core 40 and the base material 20 having the daylighting sections 30 thereon are supported by the loop formed by the winding string 430 which is fixed to the secure hanging metal fixture 420. Therefore, the base material 20 having the daylighting sections 30 thereon can be wound up toward the secure hanging metal fixture 420. In addition, since the winding core 40, connected to the first end of the base material 20, is placed over the lower part of the window pane over which the daylighting device 410 is to be installed, the winding core 40 can serve as a weight. Therefore, the daylighting device 410 can be stretched over the window pane when in use for daylighting.

Ninth Embodiment

Daylighting Device

Figure 20:
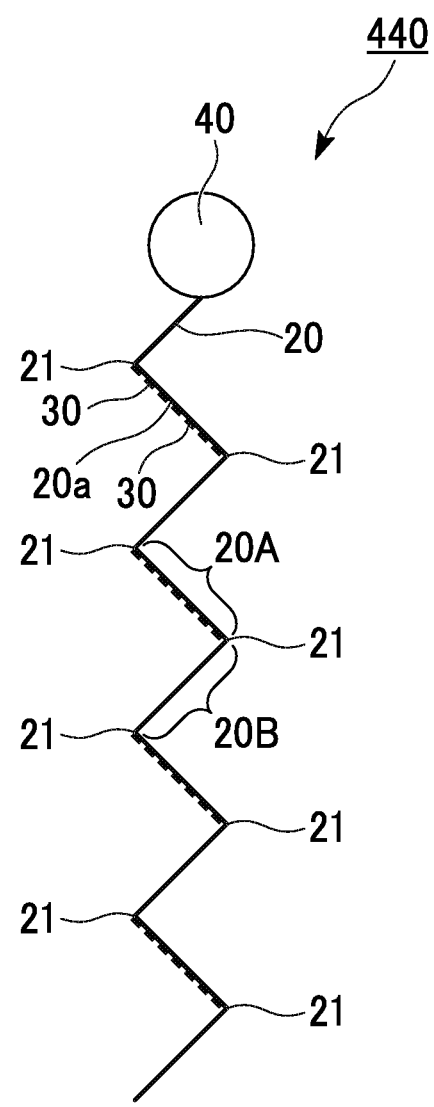
FIG. 20 is a schematic side view of a structure of a daylighting device in accordance with a ninth embodiment of the present invention.

FIG. 20 is a schematic side view of a structure of a daylighting device in accordance with a ninth embodiment of the present invention. Those members shown in FIG. 20 which are the same as those in the daylighting device of the first embodiment shown in FIGS. 1A to 1C are indicated by the same reference signs or numerals, and description thereof is omitted.

A daylighting device 440 in accordance with the present embodiment includes: a transparent and flexible base material 20; a plurality of transparent daylighting sections 30 on one of faces (i.e., a light-incident face, that is, an exterior face) 20a of the base material 20, each daylighting section 30 having protrusion portions adjacent to each other; and a winding core 40 around which is wound the base material 20 having the daylighting sections 30 thereon.

In the daylighting device 440 of the present embodiment, the base material 20 is so structured that it can be folded along folding lines 21 that are perpendicular to the lengthwise direction of the base material 20. The base material 20 can be mountain- or valley-folded along these folding lines 21, thereby being collapsible lengthwise. In addition, the base material 20 can be folded up lengthwise by being mountain- or valley-folded along the folding lines 21.

The daylighting device 440 of the present embodiment has the daylighting sections 30 disposed only on areas 20A, of the base material 20, which face the lower part of the window pane (i.e., which face the room floor) when the daylighting device 440 is installed over the window pane.

In the daylighting device 440 of the present embodiment, the base material 20 is collapsible lengthwise. Therefore, the base material 20 can be folded up in the lengthwise direction thereof. In addition, the daylighting sections 30 are disposed only on the areas 20A of the base material 20. This structure prevents the daylighting sections 30 from being damaged from mutual collision of the daylighting sections 30 when the base material 20 is folded up.

Tenth Embodiment

Daylighting Device

Figure 21:
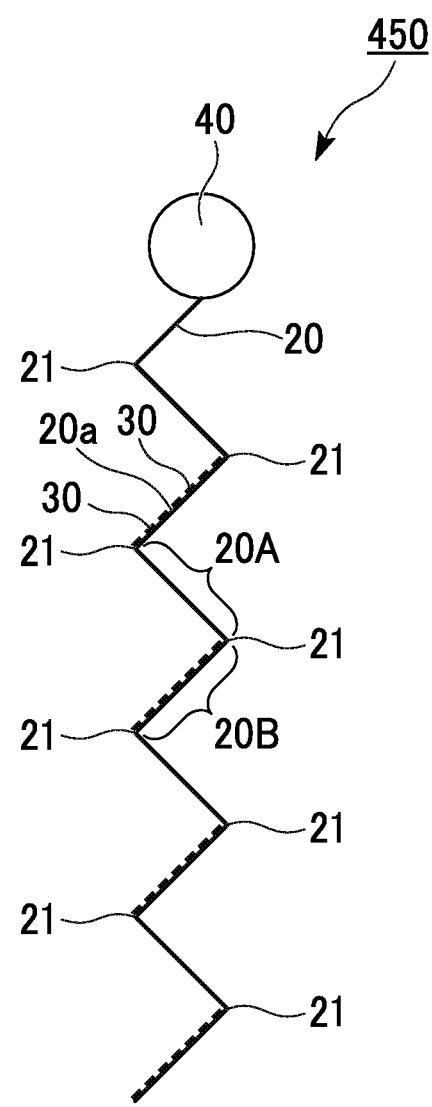
FIG. 21 is a schematic side view of a structure of a daylighting device in accordance with a tenth embodiment of the present invention.

FIG. 21 is a schematic side view of a structure of a daylighting device in accordance with a tenth embodiment of the present invention. Those members shown in FIG. 21 which are the same as those in the daylighting device of the first embodiment shown in FIGS. 1A to 1C are indicated by the same reference signs or numerals, and description thereof is omitted.

A daylighting device 450 in accordance with the present embodiment includes: a transparent and flexible base material 20; a plurality of transparent daylighting sections 30 on one of faces (i.e., a light-incident face, that is, an exterior face) 20a of the base material 20, each daylighting section 30 having protrusion portions adjacent to each other; and a winding core 40 around which is wound the base material 20 having the daylighting sections 30 thereon.

In the daylighting device 450 of the present embodiment, the base material 20 is so structured that it can be folded along folding lines 21 that are perpendicular to the lengthwise direction of the base material 20. The base material 20 can be mountain- or valley-folded along these folding lines 21, thereby being collapsible lengthwise. In addition, the base material 20 can be folded up lengthwise by being mountain- or valley-folded along the folding lines 21.

The daylighting device 450 of the present embodiment has the daylighting sections 30 disposed only on areas 20B, of the base material 20, which face the upper part of the window pane (i.e., which face the room ceiling) when the daylighting device 450 is installed over the window pane.

In the daylighting device 450 of the present embodiment, the base material 20 is collapsible lengthwise. Therefore, the base material 20 can be folded up in the lengthwise direction thereof. In addition, the daylighting sections 30 are disposed only on the areas 20B of the base material 20. This structure prevents the daylighting sections 30 from being damaged from mutual collision of the daylighting sections 30 when the base material 20 is folded up.

Eleventh Embodiment

Daylighting Device

Figure 22:
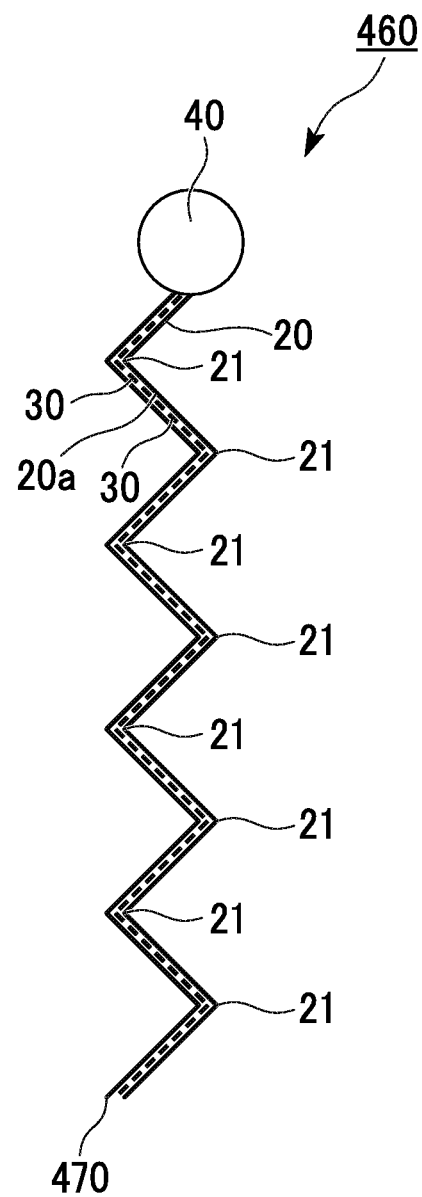
FIG. 22 is a schematic side view of a structure of a daylighting device in accordance with an eleventh embodiment of the present invention.

FIG. 22 is a schematic side view of a structure of a daylighting device in accordance with an eleventh embodiment of the present invention. Those members shown in FIG. 22 which are the same as those in the daylighting device of the first embodiment shown in FIGS. 1A to 1C are indicated by the same reference signs or numerals, and description thereof is omitted.

A daylighting device 460 in accordance with the present embodiment includes: a transparent and flexible base material 20; a plurality of transparent daylighting sections 30 on one of faces (i.e., a light-incident face, that is, an exterior face) 20a of the base material 20, each daylighting section 30 having protrusion portions adjacent to each other; a winding core 40 around which is wound the base material 20 having the daylighting sections 30 thereon; and a protection layer 470 for covering the face 20a of the base material 20 and the daylighting sections 30.

In the daylighting device 460 of the present embodiment, the base material 20 is so structured that it can be folded along folding lines 21 that are perpendicular to the lengthwise direction of the base material 20. The base material 20 can be mountain- or valley-folded along these folding lines 21, thereby being collapsible lengthwise. In addition, the base material 20 can be folded up lengthwise by being mountain- or valley-folded along the folding lines 21. When the base material 20 is folded up, the protection layer 470 can also be folded up, similarly to the base material 20.

The daylighting device 460 of the present embodiment has the daylighting sections 30 disposed on almost the entire face 20a of the base material 20.

In the daylighting device 460 of the present embodiment, the base material 20 is collapsible lengthwise. Therefore, the base material 20 can be folded up in the lengthwise direction thereof. In addition, the protection layer 470 is disposed to cover the face 20a of the base material 20 and the daylighting sections 30. This structure prevents the daylighting sections 30 from being damaged from mutual collision of the daylighting sections 30 when the base material 20 is folded up.

Twelfth Embodiment

Daylighting Device

Figure 23:
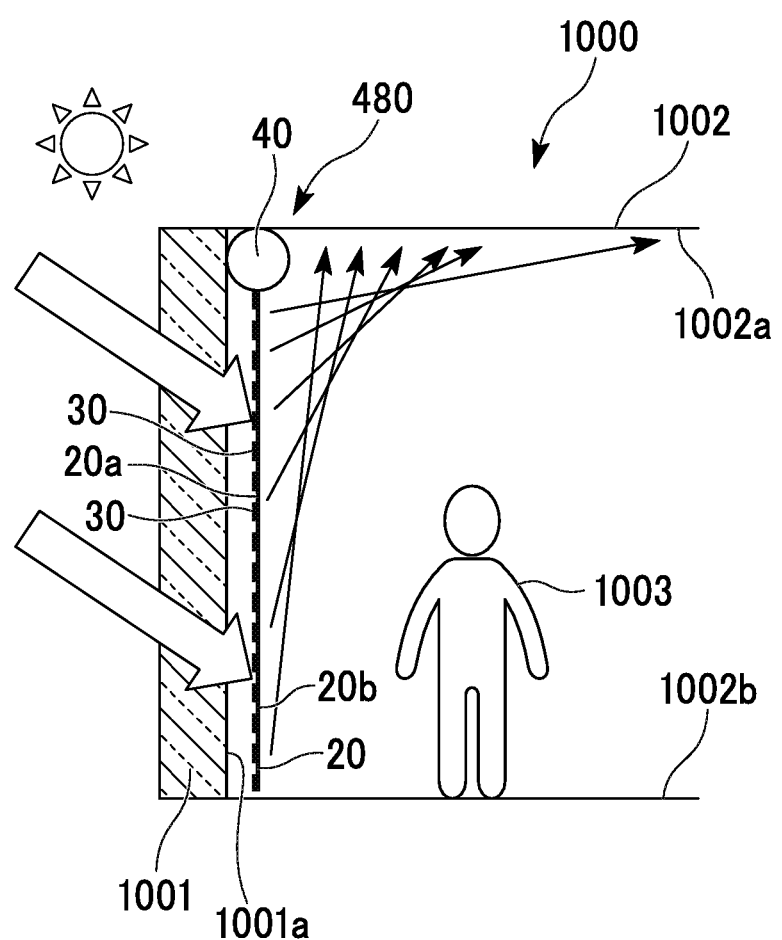
FIG. 23 is a schematic diagram of a structure of a daylighting device in accordance with a twelfth embodiment of the present invention.

FIG. 23 is a schematic diagram of a structure of a daylighting device in accordance with a twelfth embodiment of the present invention. Those members shown in FIG. 23 which are the same as those in the daylighting device of the first embodiment shown in FIGS. 1A to 1C are indicated by the same reference signs or numerals, and description thereof is omitted.

In FIG. 23, the reference number 1000 indicates a room model, the reference number 1001 a window pane, the reference number 1002 a room, the reference number 1002a a ceiling, the reference number 1002b a floor, and the reference number 1003 a person standing on the floor 1002b.

A daylighting device 480 in accordance with the present embodiment includes: a transparent and flexible base material 20; a plurality of transparent daylighting sections 30 on one of faces (i.e., a light-incident face, that is, an exterior face) 20a of the base material 20, each daylighting section 30 having protrusion portions adjacent to each other; and a winding core 40 around which is wound the base material 20 having the daylighting sections 30 thereon.

The daylighting sections 30 in the daylighting device 480 of the present embodiment are disposed in such a manner that those located closer to the lower part of the window pane 1001 (closer to the floor 1002b) can direct light more upward over the upper part of the window pane 1001 (toward the ceiling 1002a). More specifically, as shown in FIG. 23, the daylighting sections 30 are disposed in such a manner that the daylighting sections 30, as moving from the lower part of the window pane 1001 (near the floor 1002b) toward the upper part of the window pane 1001 (near the ceiling 1002a), direct light gradually less upward over the upper part of the window pane 1001 (toward the ceiling 1002a). This structure guides toward the ceiling 1002a the light striking, for example, the lower part of the window pane 1001 and the part of the window pane 1001 that is about as high as the eyes of the person 1003, thereby preventing such light from entering the eyes of the person 1003. The structure is also capable of delivering the light entering the upper part of the window pane 1001 deep into the room 1002, thereby illuminating a wide indoor area.

In the present embodiment, the daylighting sections 30 are disposed alone on the face 20a of the base material 20 as an example. This is however by no means limiting the present embodiment. Alternatively, in the present embodiment, light-scattering sections that scatter the light having transmitted through the daylighting sections 30 may be provided on at least either the face 20a or another face 20b of the base material 20 opposite the daylighting sections 30.

Thirteenth Embodiment

Daylighting Device

Figure 24A:
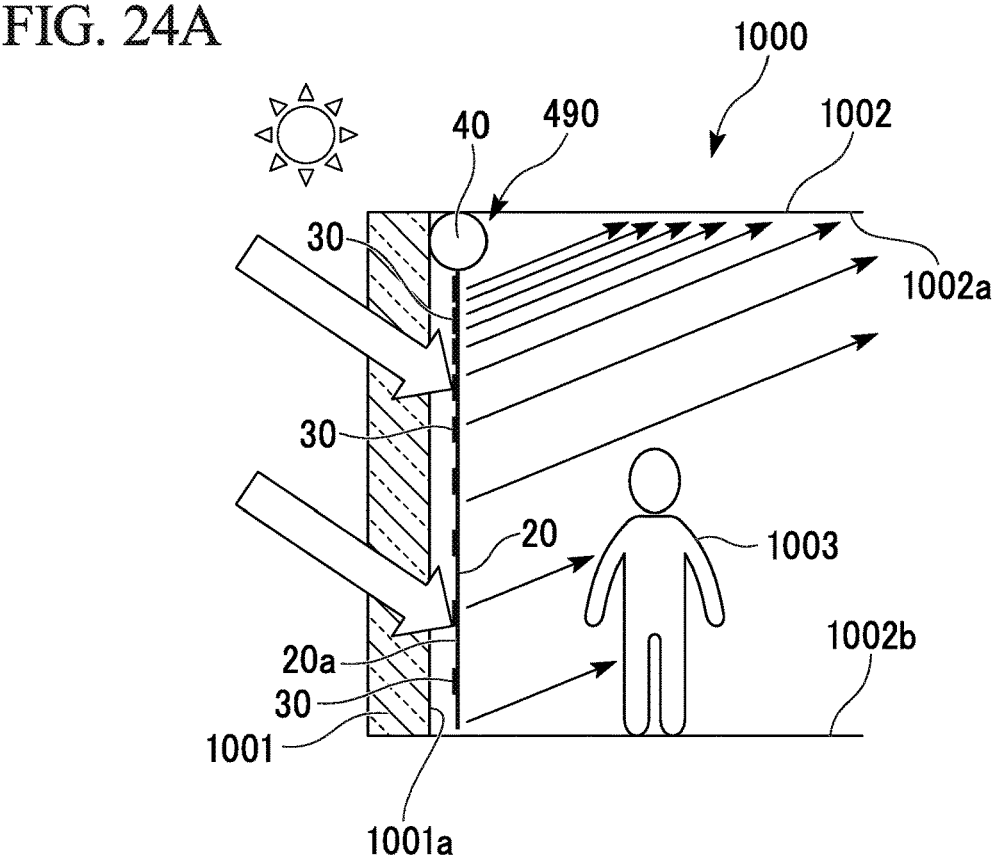
FIG. 24A is a schematic diagram of a structure of a daylighting device in accordance with a thirteenth embodiment of the present invention.
Figure 24B:
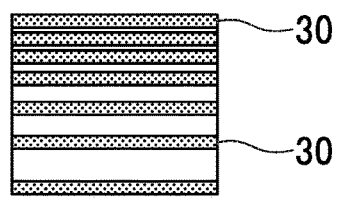
FIG. 24B is a schematic front view of daylighting sections in the daylighting device in accordance with the thirteenth embodiment of the present invention.
Figure 24C:
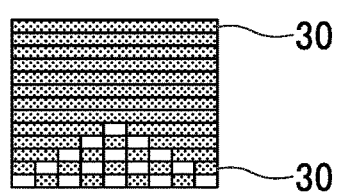
FIG. 24C is another schematic front view of the daylighting sections in the daylighting device in accordance with the thirteenth embodiment of the present invention.

FIGS. 24A to 24C are schematic diagrams of a structure of a daylighting device in accordance with a thirteenth embodiment of the present invention. FIG. 24B and FIG. 24C are front views of daylighting sections. Those members shown in FIGS. 24A to 24C which are the same as those in the daylighting device of the first embodiment shown in FIGS. 1A to 1C or the daylighting device of the twelfth embodiment shown in FIG. 23 are indicated by the same reference signs or numerals, and description thereof is omitted.

A daylighting device 490 in accordance with the present embodiment includes: a transparent and flexible base material 20; a plurality of transparent daylighting sections 30 on one of faces (i.e., a light-incident face, that is, an exterior face) 20a of the base material 20, each daylighting section 30 having protrusion portions adjacent to each other; and a winding core 40 around which is wound the base material 20 having the daylighting sections 30 thereon.

In the daylighting device 490 of the present embodiment, as shown in FIG. 24A, the ratio of the daylighting sections 30 per unit area of the face 20a of the base material 20 (i.e., the part of the area of the face 20a of the base material 20 that is covered with the daylighting sections 30) gradually grows larger from the lower part of a window pane 1001 (near a floor 1002b) toward the upper part of the window pane 1001 (near a ceiling 1002a). The daylighting sections 30 may be disposed on the face 20a of the base material 20, as an example, in such a manner that the daylighting sections 30, extending perpendicular to the lengthwise direction of the base material 20, can be separated from each other by a distance that gradually grows shorter from the lower part of the window pane 1001 (near the floor 1002b) toward the upper part of the window pane 1001 (near the ceiling 1002a) as shown in FIG. 24B. The daylighting sections 30 may be disposed on the face 20a of the base material 20, as another example, in such a manner that the daylighting sections 30 are arranged in a dot matrix form over the lower part of the window pane 1001 (near the floor 1002b) and the ratio of the daylighting sections 30 gradually grows larger from the lower part of the window pane 1001 (near the floor 1002b) toward the upper part of the window pane 1001 (near the ceiling 1002a), as shown in FIG. 24C. This structure guides toward the ceiling 1002a the light striking, for example, the lower part of the window pane 1001 and the part of the window pane 1001 that is about as high as the eyes of the person 1003, thereby preventing such light from entering the eyes of the person 1003. The structure is also capable of delivering the light entering the upper part of the window pane 1001 deep into the room 1002, thereby illuminating a wide indoor area.

In the present embodiment, the daylighting sections 30 are disposed alone on the face 20a of the base material 20 as an example. This is however by no means limiting the present embodiment. Alternatively, in the present embodiment, light-scattering sections that scatter the light having transmitted through the daylighting sections 30 may be provided on at least either the face 20a or another face 20b of the base material 20 opposite the daylighting sections 30.

Fourteenth Embodiment

Daylighting Device

Figure 25:
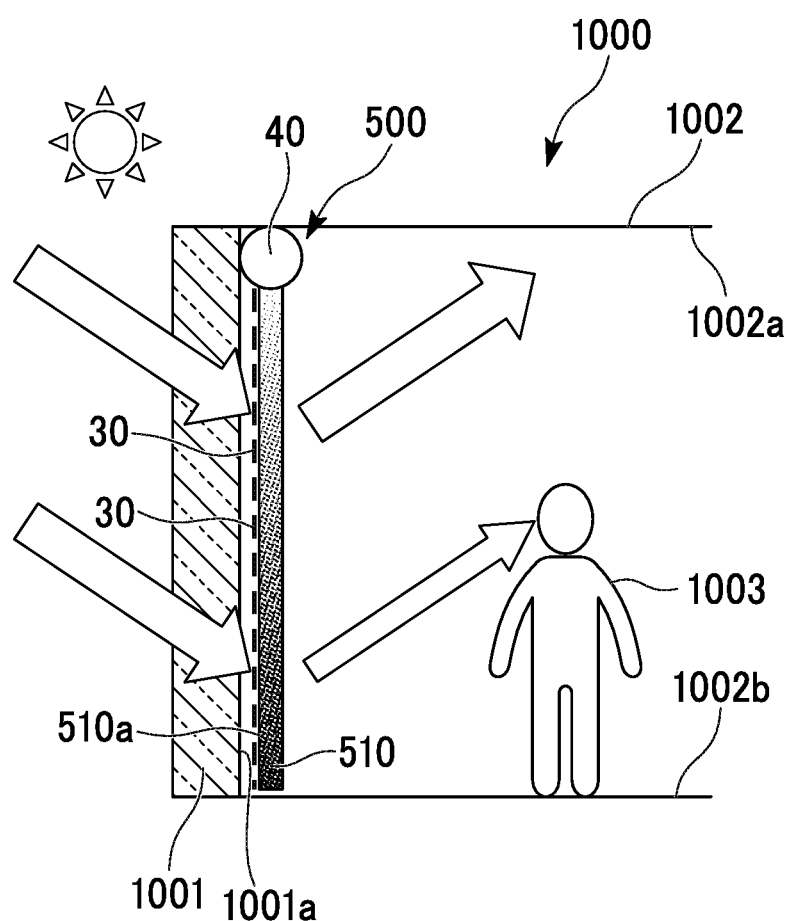
FIG. 25 is a schematic diagram of a structure of a daylighting device in accordance with a fourteenth embodiment of the present invention.

FIG. 25 is a schematic diagram of a structure of a daylighting device in accordance with a fourteenth embodiment of the present invention. Those members shown in FIG. 25 which are the same as those in the daylighting device of the first embodiment shown in FIGS. 1A to 1C or the daylighting device of the twelfth embodiment shown in FIG. 23 are indicated by the same reference signs or numerals, and description thereof is omitted.

A daylighting device 500 in accordance with the present embodiment includes: a transparent and flexible base material 510; a plurality of transparent daylighting sections 30 on one of faces (i.e., a light-incident face, that is, an exterior face) 510a of the base material 510, each daylighting section 30 having protrusion portions adjacent to each other; and a winding core 40 around which is wound the base material 510 having the daylighting sections 30 thereon.

In the daylighting device 500 of the present embodiment, the base material 510 exhibits a transmittance that gradually changes in the lengthwise direction thereof. More specifically, the base material 510 exhibits a transmittance that gradually increases from the lower part of a window pane 1001 (near a floor 1002b) toward the upper part of the window pane 1001 (near a ceiling 1002a). The base material 510 having such properties is, for example, a cloth in which the weaving density of fibers varies in some parts. Specifically, the base material 510 has a weaving density of fibers that gradually decreases in the lengthwise direction thereof.

In the daylighting device 500 of the present embodiment, the base material 510 has a transmittance that gradually increases from the lower part of the window pane 1001 (near the floor 1002b) toward the upper part of the window pane 1001 (near the ceiling 1002a). This structure reduces the amount of light entering the room 1002 through from the lower part of the window pane 1001 up to the part of the window pane 1001 that is about as high as the eyes of the person 1003, thereby preventing such light from entering the eyes of the person 1003. The structure is also capable of increasing the amount of light entering the room 1002 through the upper part of the window pane 1001 and delivering light deep into the room 1002, thereby illuminating a wide area in the room 1002.

Fifteenth Embodiment

Daylighting Device

Figure 26:
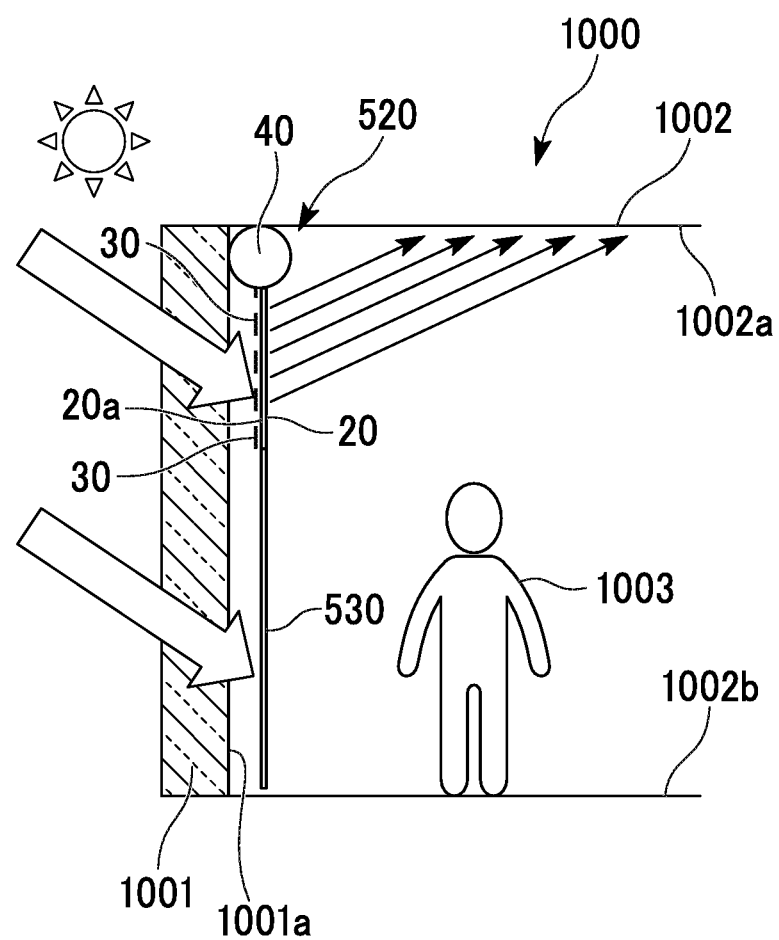
FIG. 26 is a schematic diagram of a structure of a daylighting device in accordance with a fifteenth embodiment of the present invention.

FIG. 26 is a schematic diagram of a structure of a daylighting device in accordance with a fifteenth embodiment of the present invention. Those members shown in FIG. 26 which are the same as those in the daylighting device of the first embodiment shown in FIGS. 1A to 1C or the daylighting device of the twelfth embodiment shown in FIG. 23 are indicated by the same reference signs or numerals, and description thereof is omitted.

A daylighting device 520 in accordance with the present embodiment includes: a transparent and flexible base material 20; a plurality of transparent daylighting sections 30 on one of faces (i.e., a light-incident face, that is, an exterior face) 20a of the base material 20, each daylighting section 30 having protrusion portions adjacent to each other; a light-blocking base material 530 attached to the base material 20; and a winding core 40 around which are wound the light-blocking base material 530 and the base material 20 having the daylighting sections 30 thereon.

The daylighting device 520 of the present embodiment includes: the base material 20 over the upper part of an interior face 1001a of a window pane 1001 (near a ceiling 1002a), the base material 20 having the daylighting sections 30 thereon; and the light-blocking base material 530 over the lower part of the interior face 1001a of the window pane 1001 (near a floor 1002b), the light-blocking base material 530 attached to the base material 20.

The "light-blocking base material 530 being attached to the base material 20" means that the light-blocking base material 530 is hanging down from the bottom end of the base material 20.

The light-blocking base material 530 is constituted primarily of a roll screen composed of a material that does not transmit light (an opaque material).

Examples of such an opaque material include: a film (base material) prepared by adding a pigment to triacetyl cellulose (TAC), polyethylene terephthalate (PET), cycloolefin polymer (COP), polycarbonate (PC), polyethylene naphthalate (PEN), polyether sulfone (PES), polyimide (PI), or a like transparent resin and molding the resultant substance into a predetermined shape; an opaque aluminum foil; and, an opaque (i.e., high weaving density) fabric (cloth).

In the daylighting device 520 of the present embodiment, the light-blocking base material 530 blocks light incident to the lower part of the interior face 1001a of the window pane 1001 (near the floor 1002b) and hence allows light to enter the room 1002 via the base material 20 and the daylighting sections 30 only through the upper part of the interior face 1001a of the window pane 1001 (near the ceiling 1002a), thereby preventing light from entering the eyes of the person 1003. The daylighting device 520 is also capable of delivering the light entering the upper part of the window pane 1001 deep into the room 1002, thereby illuminating a wide area in the room 1002.

Sixteenth Embodiment

Daylighting Device

Figure 27A:
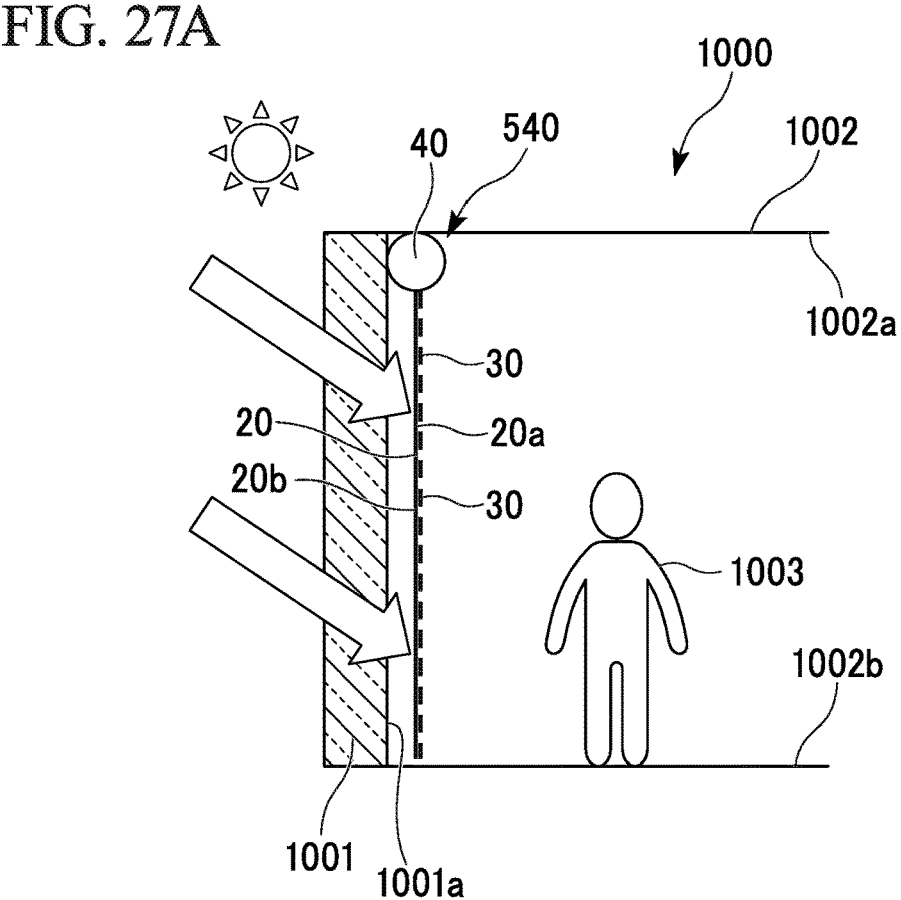
FIG. 27A is a schematic overall view of a structure of a daylighting device in accordance with a sixteenth embodiment of the present invention.
Figure 27B:
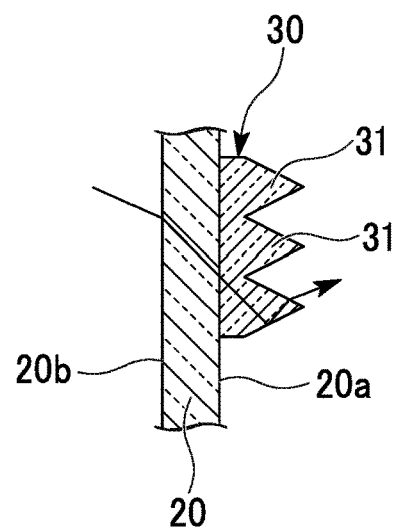
FIG. 27B is a schematic diagram of the structure of the daylighting device in accordance with the sixteenth embodiment of the present invention, illustrating a part of FIG. 27A in a scaled-up manner.
Figure 28A:
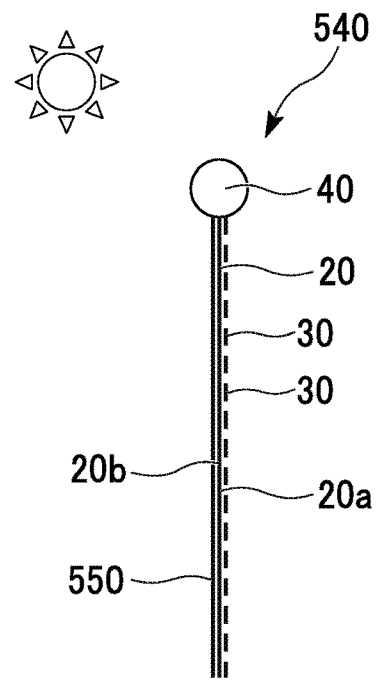
FIG. 28A is a schematic side view of the structure of the daylighting device in accordance with the sixteenth embodiment of the present invention.
Figure 28B:
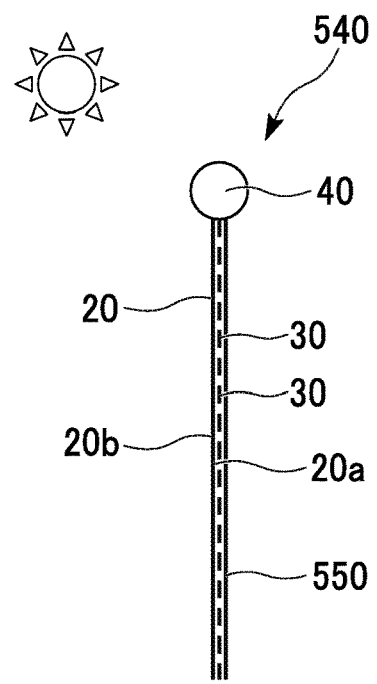
FIG. 28B is another schematic side view of the structure of the daylighting device in accordance with the sixteenth embodiment of the present invention.

FIGS. 27A and 27B are schematic diagrams of a structure of a daylighting device in accordance with a sixteenth embodiment of the present invention. FIG. 27A gives an overall view, whereas FIG. 27B illustrates a part of FIG. 27A in a scaled-up manner. FIGS. 28A and 28B are schematic side views of the structure of the daylighting device in accordance with the sixteenth embodiment of the present invention. Those members shown in FIGS. 27A, 27B, 28A, and 28B which are the same as those in the daylighting device of the first embodiment shown in FIGS. 1A to 1C and 2 or the daylighting device of the twelfth embodiment shown in FIG. 23 are indicated by the same reference signs or numerals, and description thereof is omitted.

A daylighting device 540 in accordance with the present embodiment includes: a transparent and flexible base material 20; a plurality of transparent daylighting sections 30 on one of faces (i.e., an interior face) 20a of the base material 20, each daylighting section 30 having protrusion portions 31 adjacent to each other; and a winding core 40 around which is wound the base material 20 having the daylighting sections 30 thereon.

The base material 20 may contain, for example, an ultraviolet light absorber, an infrared light absorber, and/or the like in such a manner that these components do not impair the transparency (light-transmitting properties) and flexibility of the base material 20. The inclusion of an ultraviolet light absorber, an infrared light absorber, and/or the like in the base material 20 would restrain the daylighting sections 30 from being degraded under external light.

In the daylighting device 540 of the present embodiment, there may be provided a light-diffusion sheet 550 facing another face (i.e., a light-incident face, that is, an exterior face) 20b of the base material 20. Alternatively, the light-diffusion sheet 550 may be provided facing the face (i.e., the interior face) 20a of the base material 20.

Seventeenth Embodiment

Daylighting Device

Figure 29A:
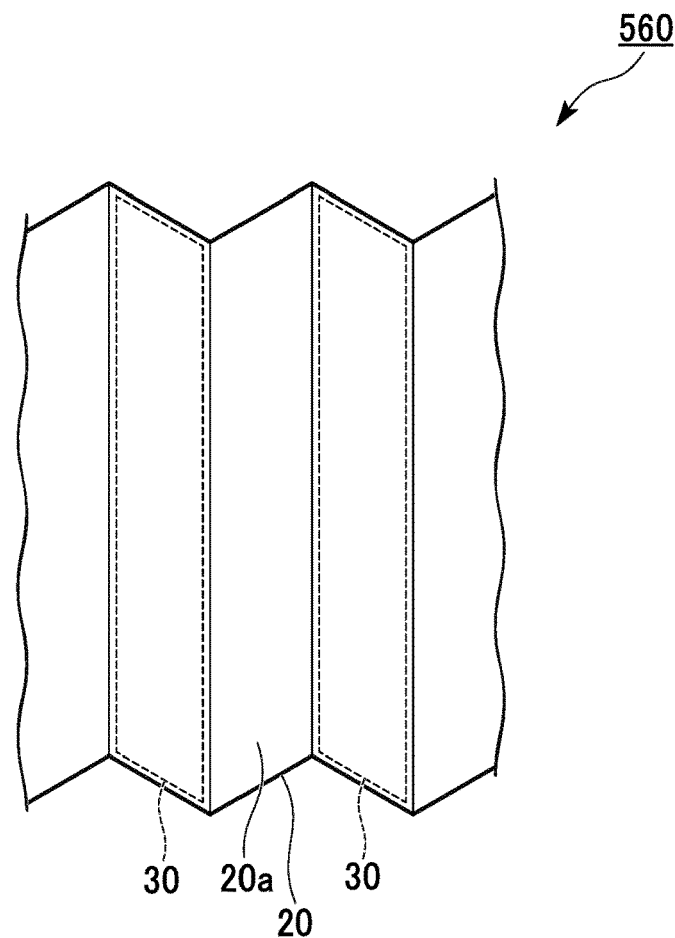
FIG. 29A is a schematic perspective view of a structure of a daylighting device in accordance with a seventeenth embodiment of the present invention.
Figure 29B:
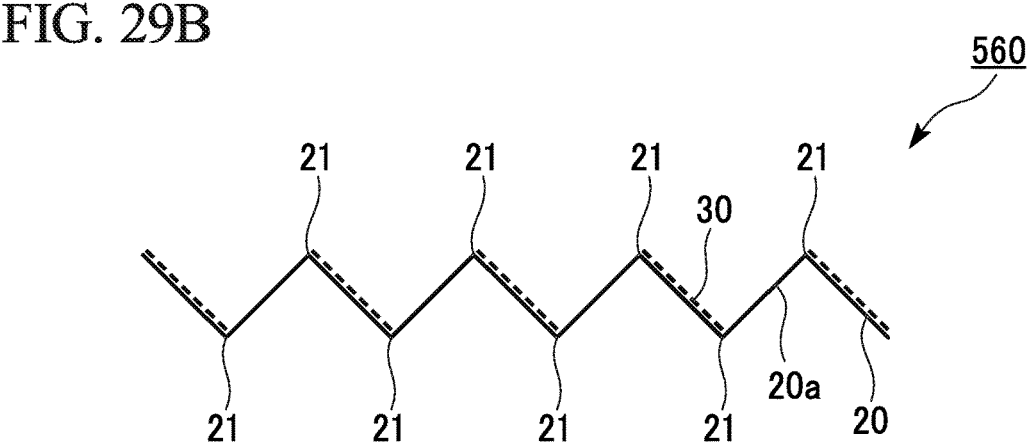
FIG. 29B is a schematic plan view of the structure of the daylighting device in accordance with the seventeenth embodiment of the present invention.

FIGS. 29A and 29B are a schematic perspective view and a schematic plan view, respectively, of a structure of a daylighting device in accordance with a seventeenth embodiment of the present invention. Those members shown in FIGS. 29A and 29B which are the same as those in the daylighting device of the first embodiment shown in FIGS. 1A to 1C are indicated by the same reference signs or numerals, and description thereof is omitted.

A daylighting device 560 in accordance with the present embodiment includes: a transparent and flexible base material 20; and a plurality of transparent daylighting sections 30 on one of faces (i.e., a light-incident face, that is, an exterior face) 20a of the base material 20, each daylighting section 30 having protrusion portions adjacent to each other.

In the daylighting device 560 of the present embodiment, the base material 20 is so structured that it can be folded along folding lines 21 that are perpendicular to the widthwise direction of the base material 20. The base material 20 can be mountain- or valley-folded along these folding lines 21, thereby being collapsible widthwise. In addition, the base material 20 can be folded up widthwise by being mountain- or valley-folded along the folding lines 21. Therefore, the daylighting device 560 of the present embodiment can be installed so as to hang down parallel to the folding lines 21 of the base material 20 (perpendicular to the widthwise direction of the base material 20).

In the daylighting device 560 of the present embodiment, the daylighting sections 30 are disposed only on those segments of the base material 20 which have substantially equal tilting angles to the window pane over which the daylighting device 560 is to be installed. In other words, the daylighting sections 30 are disposed on every other one of the segments of the base material 20 divided by the folding lines 21.

In the daylighting device 560 of the present embodiment, the base material 20 is collapsible widthwise. Therefore, the base material 20 can be folded up in the widthwise direction thereof. In addition, the daylighting sections 30 are disposed only on those segments of the base material 20 which have substantially equal tilting angles to the window pane. This structure prevents the daylighting sections 30 from being damaged from mutual collision of the daylighting sections 30 when the base material 20 is folded up.

Eighteenth Embodiment

Daylighting Device

Figure 30A:
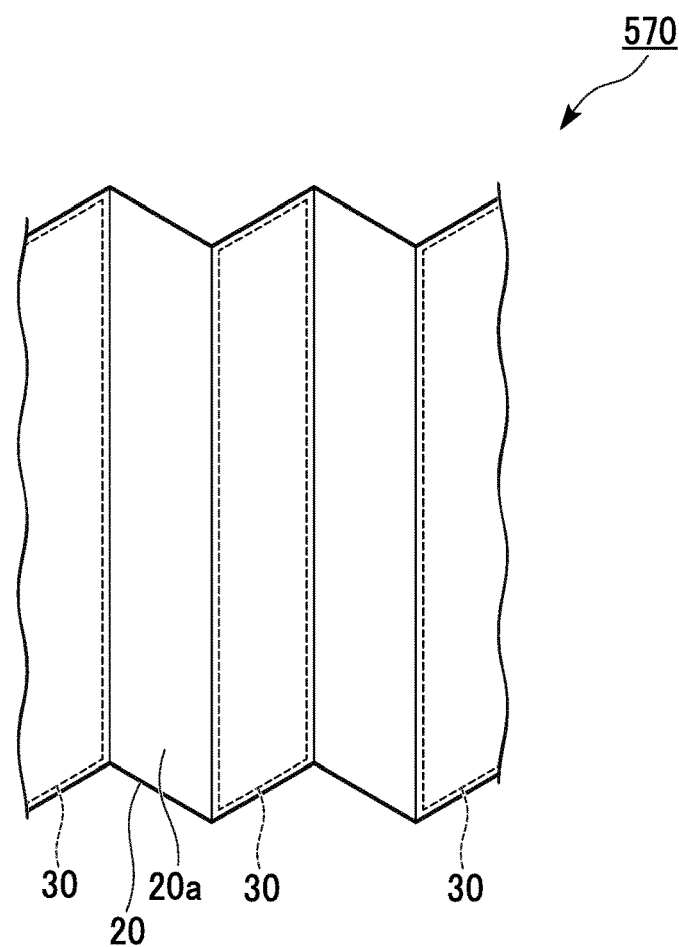
FIG. 30A is a schematic perspective view of a structure of a daylighting device in accordance with an eighteenth embodiment of the present invention.
Figure 30B:
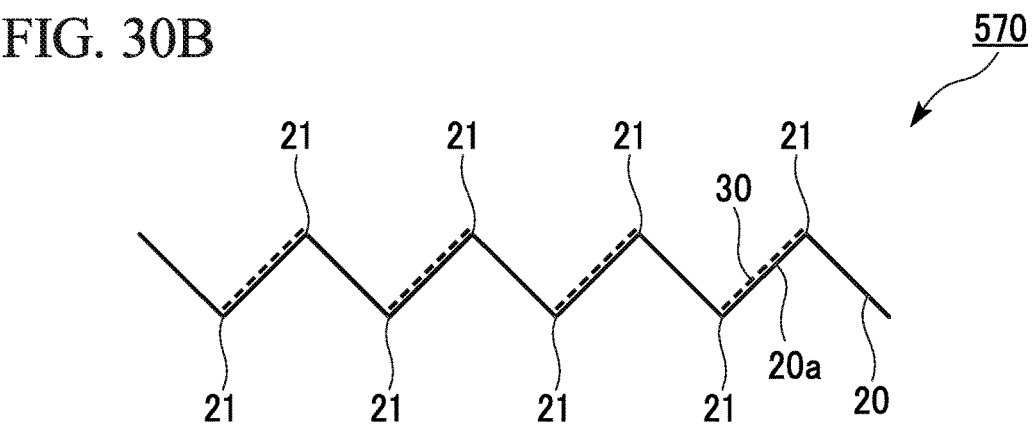
FIG. 30B is a schematic plan view of the structure of the daylighting device in accordance with the eighteenth embodiment of the present invention.

FIGS. 30A and 30B are a schematic perspective view and a schematic plan view, respectively, of a structure of a daylighting device in accordance with an eighteenth embodiment of the present invention. Those members shown in FIGS. 30A and 30B which are the same as those in the daylighting device of the first embodiment shown in FIGS. 1A to 1C are indicated by the same reference signs or numerals, and description thereof is omitted.

A daylighting device 570 in accordance with the present embodiment includes: a transparent and flexible base material 20; and a plurality of transparent daylighting sections 30 on one of faces (i.e., a light-incident face, that is, an exterior face) 20a of the base material 20, each daylighting section 30 having protrusion portions adjacent to each other.

In the daylighting device 570 of the present embodiment, the base material 20 is so structured that it can be folded along folding lines 21 that are perpendicular to the widthwise direction of the base material 20. The base material 20 can be mountain- or valley-folded along these folding lines 21, thereby being collapsible widthwise. In addition, the base material 20 can be folded up widthwise by being mountain- or valley-folded along the folding lines 21. Therefore, the daylighting device 570 of the present embodiment can be installed so as to hang down parallel to the folding lines 21 of the base material 20 (perpendicular to the widthwise direction of the base material 20).

In the daylighting device 570 of the present embodiment, the daylighting sections 30 are disposed only on those segments of the base material 20 which have substantially equal tilting angles to the window pane over which the daylighting device 570 is to be installed. In other words, the daylighting sections 30 are disposed on every other one of the segments of the base material 20 divided by the folding lines 21.

In the daylighting device 570 of the present embodiment, the base material 20 is collapsible widthwise. Therefore, the base material 20 can be folded up in the widthwise direction thereof. In addition, the daylighting sections 30 are disposed only on those segments of the base material 20 which have substantially equal tilting angles to the window pane. This structure prevents the daylighting sections 30 from being damaged from mutual collision of the daylighting sections 30 when the base material 20 is folded up.

Nineteenth Embodiment

Daylighting Device

Figure 31A:
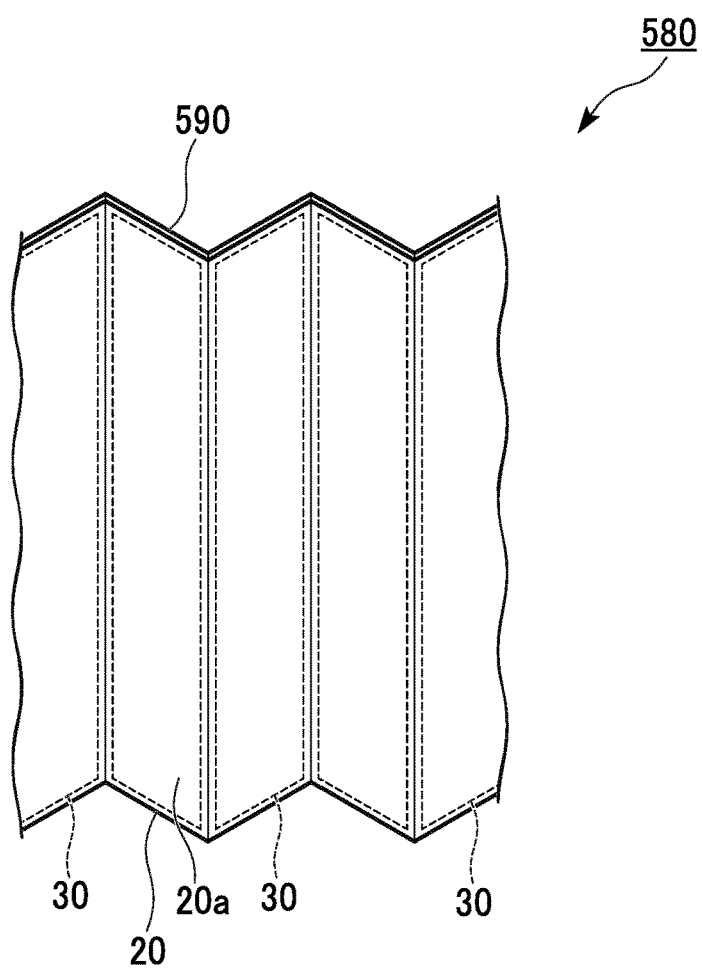
FIG. 31A is a schematic perspective view of a structure of a daylighting device in accordance with a nineteenth embodiment of the present invention.
Figure 31B:
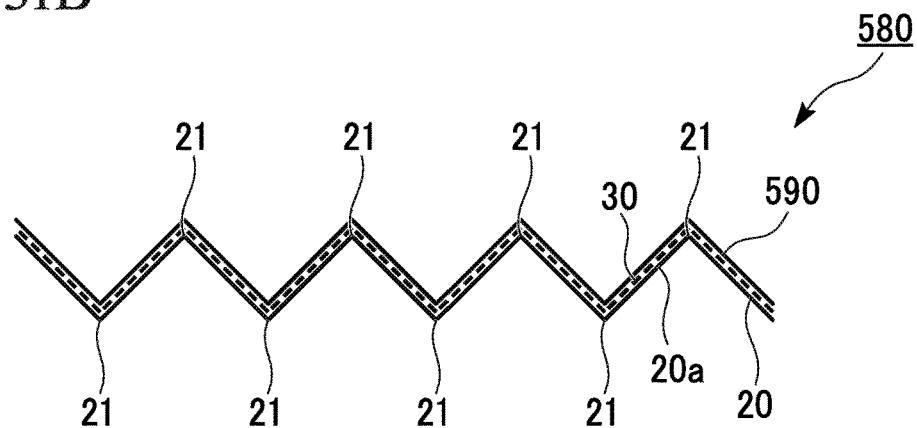
FIG. 31B is a schematic plan view of the structure of the daylighting device in accordance with the nineteenth embodiment of the present invention.

FIGS. 31A and 31B are a schematic perspective view and a schematic plan view, respectively, of a structure of a daylighting device in accordance with a nineteenth embodiment of the present invention. Those members shown in FIGS. 31A and 31B which are the same as those in the daylighting device of the first embodiment shown in FIGS. 1A to 1C are indicated by the same reference signs or numerals, and description thereof is omitted.

A daylighting device 580 in accordance with the present embodiment includes: a transparent and flexible base material 20; a plurality of transparent daylighting sections 30 on one of faces (i.e., a light-incident face, that is, an exterior face) 20a of the base material 20, each daylighting section 30 having protrusion portions adjacent to each other; and a protection layer 590 for covering the face 20a of the base material 20 and the daylighting sections 30.

In the daylighting device 580 of the present embodiment, the base material 20 is so structured that it can be folded along folding lines 21 that are perpendicular to the widthwise direction of the base material 20. The base material 20 can be mountain- or valley-folded along these folding lines 21, thereby being collapsible widthwise. In addition, the base material 20 can be folded up widthwise by being mountain- or valley-folded along the folding lines 21. When the base material 20 is folded up, the protection layer 590 can also be folded up, similarly to the base material 20. Therefore, the daylighting device 580 of the present embodiment can be installed so as to hang down parallel to the folding lines 21 of the base material 20 (perpendicular to the widthwise direction of the base material 20).

The daylighting device 580 of the present embodiment has the daylighting sections 30 disposed on almost the entire face 20a of the base material 20.

In the daylighting device 580 of the present embodiment, the base material 20 is collapsible widthwise. Therefore, the base material 20 can be folded up in the widthwise direction thereof. In addition, the protection layer 590 is disposed to cover the face 20a of the base material 20 and the daylighting sections 30. This structure prevents the daylighting sections 30 from being damaged from mutual collision of the daylighting sections 30 when the base material 20 is folded up.

Twentieth Embodiment

Daylighting Device

Figure 32A:
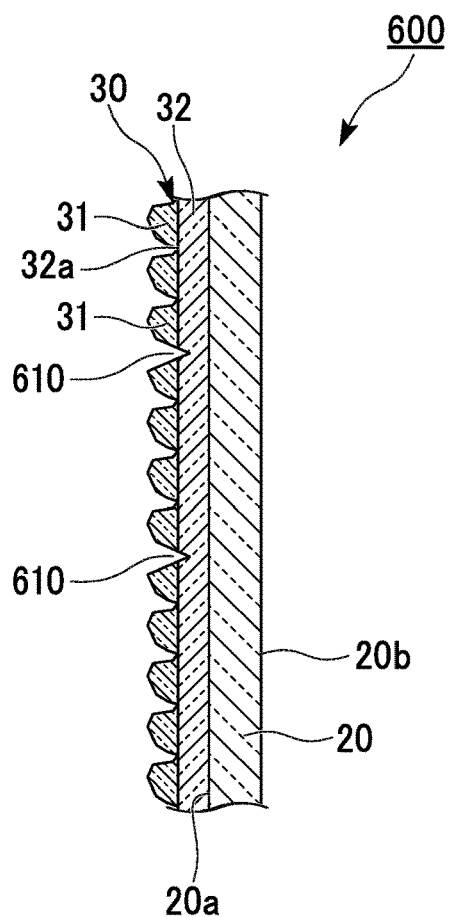
FIG. 32A is a schematic side view of a structure of a daylighting device in accordance with a twentieth embodiment of the present invention.
Figure 32B:
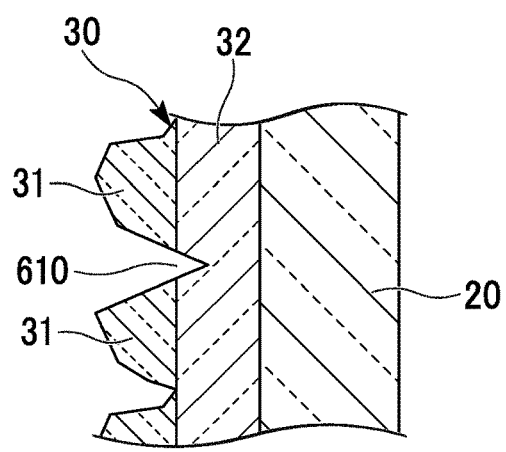
FIG. 32B is another schematic side view of the structure of the daylighting device in accordance with the twentieth embodiment of the present invention, illustrating a part of FIG. 32A in a scaled-up manner.

FIGS. 32A and 32B are schematic side views of a structure of a daylighting device in accordance with a twentieth embodiment of the present invention. FIG. 32B illustrates a part of FIG. 32A in a scaled-up manner. Those members shown in FIGS. 32A and 32B which are the same as those in the daylighting device of the first embodiment shown in FIG. 2 are indicated by the same reference signs or numerals, and description thereof is omitted.

A daylighting device 600 in accordance with the present embodiment includes: a transparent and flexible base material 20; and transparent daylighting sections 30 on a face 20a of the base material 20, each daylighting section 30 having protrusion portions 31 adjacent to each other.

A support base material 32 for the daylighting sections 30 has notches 610 in the thickness direction of the support base material 32. The notches 610 may be provided at any intervals, which may be adjusted in a suitable manner in accordance with flexibility and other requirements of the daylighting device 600. The notches 610 may also have any depth, which may be adjusted in a suitable manner in accordance with flexibility and other requirements of the daylighting device 600. The notches 610 may also have any cross-sectional shape including a V-shape.

In the daylighting device 600 of the present embodiment, the support base material 32 for the daylighting sections 30 has the notches 610 in the thickness direction of the support base material 32. Therefore, the daylighting sections 30 can be bent along the notches 610 so that the face (i.e., another face 20b of the base material 20) opposite the face on which the daylighting sections 30 are provided is tucked inside. Therefore, the base material 20 having the daylighting sections 30 thereon can be wound without leaving empty space.

Method of Manufacturing Daylighting Device

The following will describe an exemplary method of manufacturing a daylighting device of the present embodiment in reference to FIGS. 33A to 33D.

Figure 33A:
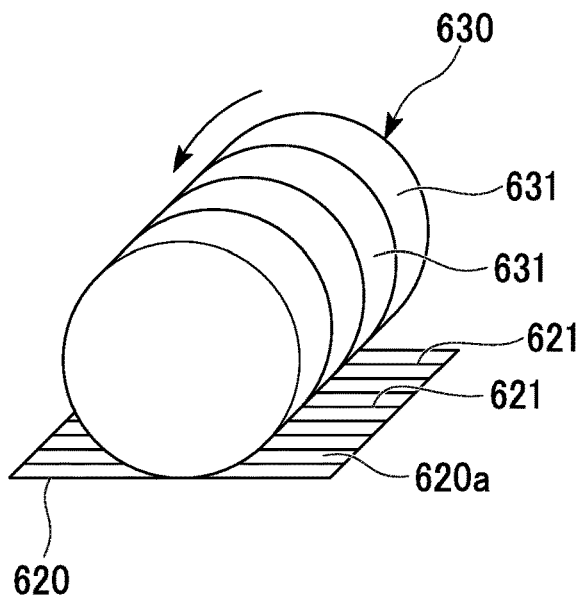
FIG. 33A is a schematic perspective view illustrating a method of manufacturing the daylighting device in accordance with the twentieth embodiment of the present invention.
Figure 33B:
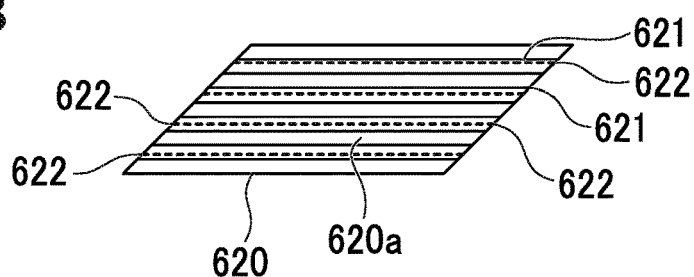
FIG. 33B is another schematic perspective view illustrating the method of manufacturing the daylighting device in accordance with the twentieth embodiment of the present invention.

A resin sheet is fabricated that will become daylighting sections 30. The resin sheet is fabricated, for example, by the following method. First of all, as shown in FIG. 33A, a resin sheet 620 having a plurality of parallel protrusion portions 621 thereon is fed, and a cutter 630 is rotated to press a plurality of rotating blades 631 of the cutter 630 onto one of faces 620a of the resin sheet 620. The cutter 630 includes the parallel rotating blades 631. The rotating blades 631 are pressed to spaces between the protrusion portions 621 on the face 620a of the resin sheet 620. Additionally, the rotating blades 631 are pressed to not all the spaces between the protrusion portions 621, but every one of a predetermined number of protrusion portions 621 (e.g., every three protrusion portions 621 or every four protrusion portions 621). This process forms notches 622 on the face 620a of the resin sheet 620 in the lengthwise direction of the resin sheet 620 as shown in FIG. 33B.

Figure 33C:
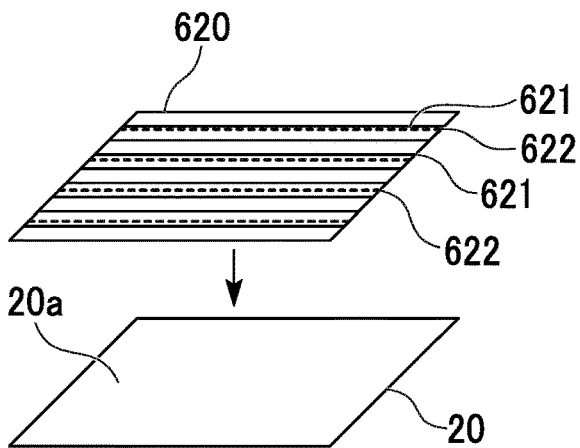
FIG. 33C is another schematic perspective view illustrating the method of manufacturing the daylighting device in accordance with the twentieth embodiment of the present invention.
Figure 33D:
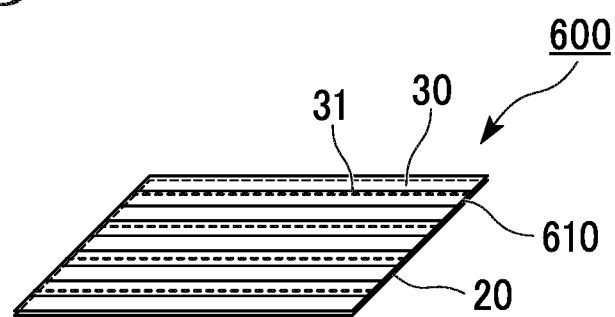
FIG. 33D is another schematic perspective view illustrating the method of manufacturing the daylighting device in accordance with the twentieth embodiment of the present invention.

The resin sheet 620 having the protrusion portions 621 and the notches 622 thereon is then placed on the face 20a of the base material 20 as shown in FIG. 33C, to obtain a daylighting device 600 shown in FIG. 33D.

Daylighting System

Figure 34:
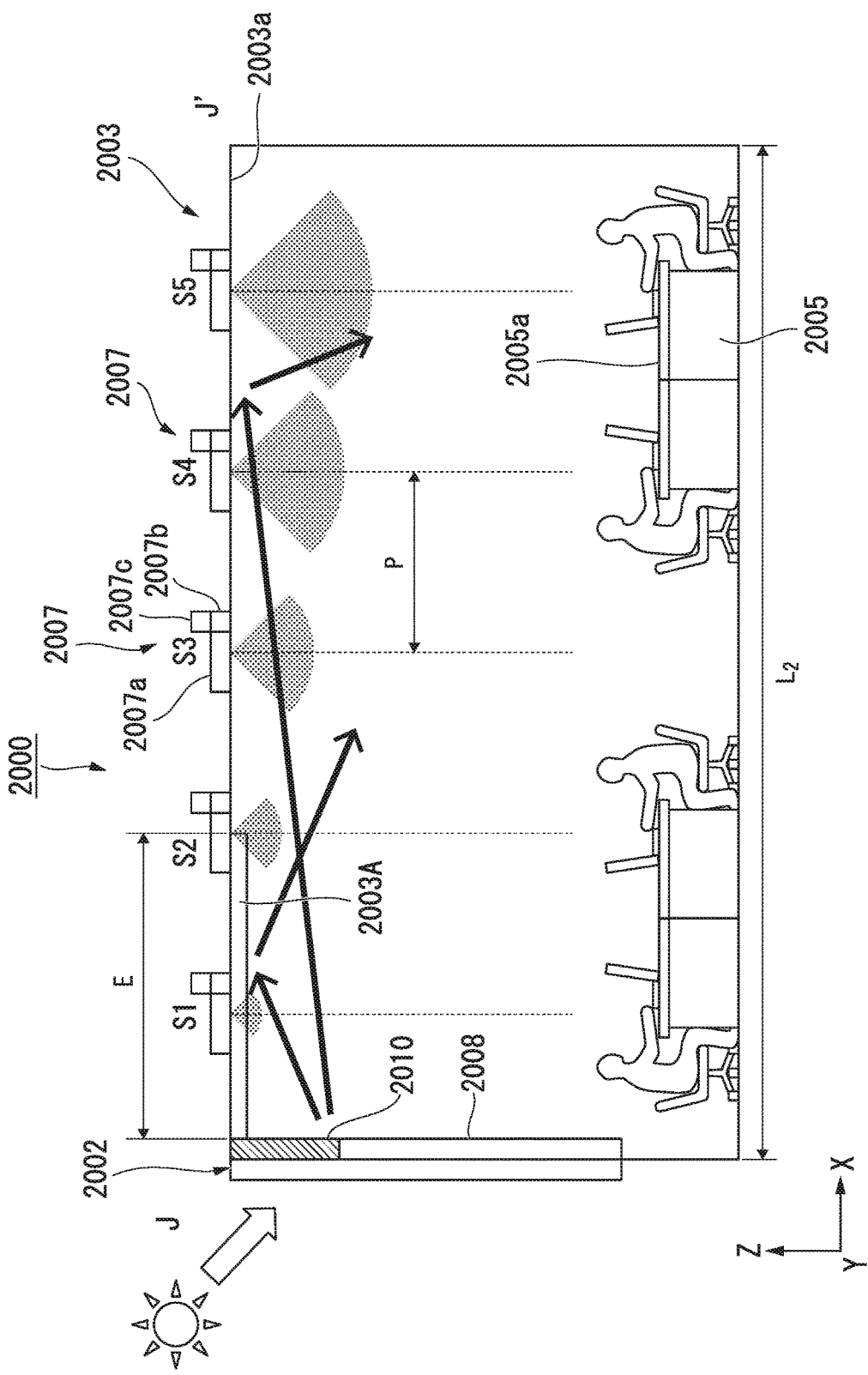
FIG. 34 is a cross-sectional view, taken along line J-J' in FIG. 35, of a room model in which a daylighting device and a lighting-modulation system are installed.
Figure 35:
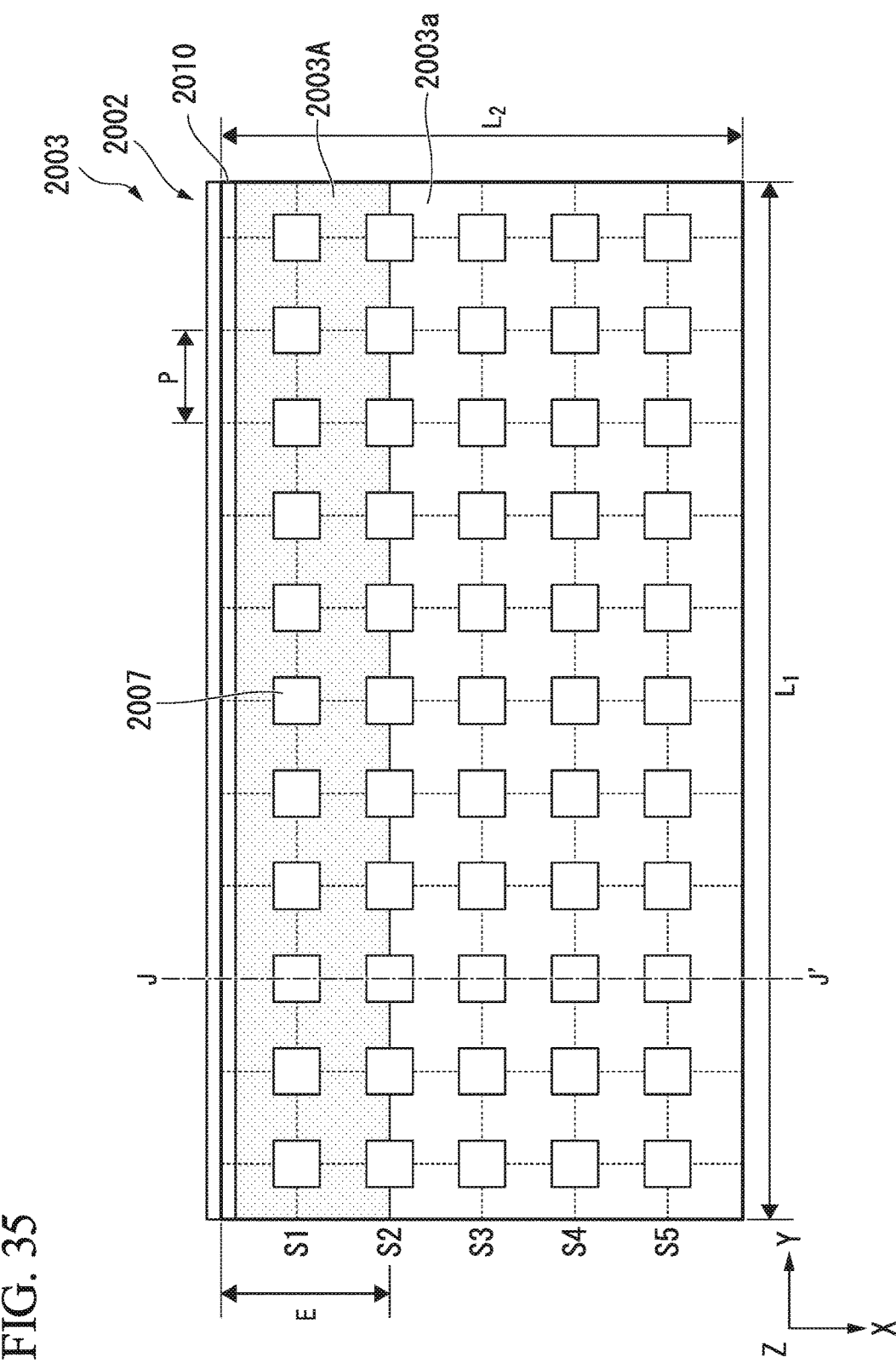
FIG. 35 is a plan view of a ceiling of the room model.

FIG. 34 is a cross-sectional view, taken along line J-J' in FIG. 35, of a room model 2000 in which a daylighting device and a lighting-modulation system are installed. FIG. 35 is a plan view of a ceiling of the room model 2000.

In the room model 2000, a room 2003 into which external light is guided has a ceiling 2003a constituted partly by a ceiling material that may have high light-reflecting properties. Referring to FIGS. 34 and 35, the ceiling 2003a of the room 2003 is provided with a light-reflecting ceiling material 2003A as the ceiling material having such light-reflecting properties. The light-reflecting ceiling material 2003A is for facilitating the guiding of external light from a daylighting device 2010 installed over a window 2002 deep into the interior. The light-reflecting ceiling material 2003A is disposed on a part of the ceiling 2003a that is close to the window, specifically, on a predetermined part E of the ceiling 2003a (approximately up to 3 meters from the window 2002).

The light-reflecting ceiling material 2003A, as described above, serves to efficiently direct deep into the interior the external light guided indoors through the window 2002 on which the daylighting device 2010 (any of the daylighting devices of the abovementioned embodiments) is installed. The external light guided toward the indoor ceiling 2003a by the daylighting device 2010 is reflected by the light-reflecting ceiling material 2003A, hence changing direction and illuminating a desk top face 2005a of a desk 2005 located deep in the interior. Thus, the light-reflecting ceiling material 2003A has such an effect that the desk top face 2005a is brightly lit up.

The light-reflecting ceiling material 2003A may be either diffuse reflective or specular reflective. Preferably, the light-reflecting ceiling material 2003A has a suitable mix of these properties to achieve both the effect that the desk top face 2005a of the desk 2005 located deep in the interior is brightly lit up and the effect that glare, uncomfortable to occupants, is suppressed.

Much of the light guided into the interior by the daylighting device 2010 travels in the direction of the part of the ceiling that is close to the window 2002. Still, the part of the interior that is close to the window 2002 often has sufficient lighting. Therefore, the light that strikes the ceiling near the window (part E) can be partially diverted to a deep part of the interior where lighting is poor compared to the part near the window, by additionally using the light-reflecting ceiling material 2003A described here.

The light-reflecting ceiling material 2003A may be manufactured, for example, by embossing irregularities each of approximately several tens of micrometers on an aluminum or similar metal plate or by vapor-depositing a thin film of aluminum or a similar metal on the surface of a resin substrate having similar irregularities formed thereon. Alternatively, the embossed irregularities may be formed from a curved surface with a higher cycle.

Furthermore, the embossed shape formed on the light-reflecting ceiling material 2003A may be changed as appropriate to control light distribution properties thereof and hence resultant indoor light distribution. For example, if stripes extending deep into the interior are embossed, the light reflected by the light-reflecting ceiling material 2003A is spread to the left and right of the window 2002 (in the directions that intersect the length of the irregularities). When the window 2002 of the room 2003 is limited in size or orientation, these properties of the light-reflecting ceiling material 2003A can be exploited to diffuse light in horizontal directions and at the same time reflect the light deep into the room.

The daylighting device 2010 is used as a part of a lighting-modulation system for the room 2003. The lighting-modulation system includes, for example, the daylighting device 2010, a plurality of room lighting devices 2007, an insolation adjustment device 2008 installed over the window, a control system for these devices, the light-reflecting ceiling material 2003A installed on the ceiling 2003a, and other structural members of the whole room.

The window 2002 of the room 2003 has the daylighting device 2010 installed over an upper portion thereof and the insolation adjustment device 2008 installed over a lower portion thereof. In this example, the insolation adjustment device 2008 is a window shade, which is by no means intended to be limiting the scope of the invention.

In the room 2003, the room lighting devices 2007 are arranged in a lattice in the left/right direction (Y direction) of the window 2002 and in the depth direction of the room (X direction). These room lighting devices 2007, as well as the daylighting device 2010, constitute an illumination system for the whole room 2003.

Referring to FIGS. 34 and 35 illustrating the office ceiling 2003a, for example, the window 2002 has a length $L_1$ of 18 meters in the left/right direction (Y direction), and the room 2003 has a length (depth) $L_2$ of 9 meters in the X direction. The room lighting devices 2007 in this example are arranged in a lattice in the length (Y direction) and depth (X direction) of the ceiling 2003a at intervals P each of 1.8 meters. More specifically, a total of 50 room lighting devices 2007 is arranged in a lattice of 10 rows (Y direction) and 5 columns (X direction).

Each room lighting device 2007 includes an interior lighting fixture 2007a, a brightness detection unit 2007b, and a control unit 2007c. The brightness detection unit 2007b and the control unit 2007c are integrated into the interior lighting fixture 2007a to form a single structure.

Each room lighting device 2007 may include two or more interior lighting fixtures 2007a and two or more brightness detection units 2007b, with one brightness detection unit 2007b for each interior lighting fixture 2007a. The brightness detection unit 2007b, receiving a reflection off the face illuminated by the interior lighting fixture 2007a, detects illuminance on that face. In this example, the brightness detection unit 2007b detects illuminance on the desk top face 2005a of the desk 2005 located in the interior.

The control units 2007c, each for a different one of the room lighting devices 2007, are connected to each other. In each room lighting device 2007, the control unit 2007c, connected to the other control units 2007c, performs feedback control to adjust the light output of an LED lamp in the interior lighting fixture 2007a so that the illuminance on the desk top face 2005a detected by the brightness detection unit 2007b is equal to a predetermined target illuminance L0 (e.g., an average illuminance: 750 lx).

INDUSTRIAL APPLICABILITY

The present invention, in some aspects thereof, is applicable to daylighting films, window panes, roll screens, and daylighting louvers.

REFERENCE SIGNS LIST 10, 120, 150, 190, 340, 360, 380, 410, 440, 450, 460, 480, 490, 500, 520, 540, 560, 570, 580, 600: Daylighting Device
20, 180, 350, 370, 390, 510: Base Material
21: Folding Line
30: Daylighting Section
31, 81, 91, 131, 241, 251, 351, 401, 621: Protrusion Portion
32: Support Base Material
40: Winding Core
51: String-like Member
52, 53, 141, 142, 160, 170, 210: Adhesive Agent
60, 220: Roller
70, 71, 620: Resin Sheet
61, 221: Resin Application Machine
62, 222: Transfer Roll Metal Die
90, 250: Resin Base Material
100, 260: Metal Die
130, 200: Light-scattering Section
201: Adhesive Layer
202: Filler
80, 240: Photocuring Resin
64, 224: Cutting Machine
371: Resin Layer
372: Filler
400, 550: Light-diffusion Sheet
420: Secure Hanging Metal Fixture
430: Winding String
470, 590: Protection Layer
530: Light-blocking Base Material
610, 622: Notch

The invention claimed is:

1. A daylighting device comprising:
a flexible base material having light-transmitting properties; and
at least three daylighting sections on one face of the flexible base material, each of the at least three daylighting sections having light-transmitting properties and comprising at least two protrusion portions adjacent to each other,
wherein each of the at least two protrusion portions extend in a lengthwise direction, and
the at least two protrusion portions are polygonal in a cross-sectional view taken perpendicular to the lengthwise direction, the polygonal being not triangular or quadrilateral.

2. The daylighting device according to claim 1, wherein the at least three daylighting sections are disposed without leaving empty space therebetween on the one face of the flexible base material.

3. The daylighting device according to claim 1, further comprising light-scattering sections on at least one of the one face and another face of the flexible base material at locations corresponding to the at least three daylighting sections, the light-scattering sections being configured to scatter light having transmitted through the at least three daylighting sections.

4. The daylighting device according to claim 3, wherein the light-scattering sections are anisotropic with respect to light-scattering direction.

5. The daylighting device according to claim 3, wherein the light-scattering sections scatter therein light incident to the light-scattering sections.

6. The daylighting device according to claim 3, wherein the light-scattering sections are sewn onto the flexible base material using a string-like member.

7. The daylighting device according to claim 3, wherein the light-scattering sections are fixed to the flexible base material via an adhesive agent.

8. The daylighting device according to claim 1, wherein the at least three daylighting sections comprise light-scattering sections configured to scatter light incident to the at least three daylighting sections.

9. The daylighting device according to claim 1, wherein the flexible base material has such light-scattering properties as to scatter light having transmitted through the at least three daylighting sections.

10. The daylighting device according to claim 9, wherein the flexible base material is anisotropic with respect to light-scattering direction.

11. The daylighting device according to claim 9, wherein the flexible base material scatters therein light incident to the flexible base material.

12. The daylighting device according to claim 1, wherein the at least three daylighting sections are sewn onto the flexible base material using a string-like member.

13. The daylighting device according to claim 1, wherein the at least three daylighting sections are fixed to the flexible base material via an adhesive agent.

14. The daylighting device according to claim 1, wherein the flexible base material has an end thereof fixed to a winding core so that the flexible base material can be wound around the winding core.

15. A daylighting system comprising:
the daylighting device according to claim 1;
an interior lighting fixture;
a detection unit configured to detect indoor brightness; and
a control unit configured to control the interior lighting fixture and the detection unit.

16. The daylighting device according to claim 1, wherein the at least three daylighting sections comprise:
a first daylighting section;
a second daylighting section; and
a third daylighting section, and
a first interval between the first daylighting section and the second daylighting section is smaller than a second interval between the second daylighting section and the third daylighting section.

17. The daylighting device according to claim 1, the daylighting device further comprising:
at least three support base materials on the one face of the flexible base material, each of the at least three support base materials having light-transmitting properties, wherein
the at least two protrusion portions are on each of the at least three support base materials, each of the at least two protrusion portions having light-transmitting properties.

18. The daylighting device according to claim 17, wherein the at least three support base materials do not have flexibility.

* * * * *